(12) United States Patent
Zhang et al.

(10) Patent No.: US 12,457,029 B2
(45) Date of Patent: Oct. 28, 2025

(54) WIRELESS NODE SELF-INTERFERENCE MEASUREMENTS AND UPLINK BEAM MANAGEMENT FOR FULL DUPLEX TRANSMISSIONS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 187 days.

(21) Appl. No.: 18/499,616

(22) Filed: Nov. 1, 2023

(65) Prior Publication Data

US 2024/0064545 A1    Feb. 22, 2024

Related U.S. Application Data

(62) Division of application No. 17/322,437, filed on May 17, 2021, now Pat. No. 11,838,778.

(60) Provisional application No. 63/027,743, filed on May 20, 2020, provisional application No. 63/027,745, filed on May 20, 2020.

(51) Int. Cl.
| | | |
|---|---|---|
| *H04W 24/08* | (2009.01) | |
| *H04B 7/06* | (2006.01) | |
| *H04L 5/00* | (2006.01) | |
| *H04L 5/14* | (2006.01) | |
| *H04W 24/10* | (2009.01) | |
| *H04W 72/21* | (2023.01) | |

(52) U.S. Cl.
CPC ....... *H04B 7/06966* (2023.05); *H04L 5/0048* (2013.01); *H04L 5/14* (2013.01); *H04W 24/08* (2013.01); *H04W 24/10* (2013.01); *H04W 72/21* (2023.01)

(58) Field of Classification Search
CPC ..... H04W 24/08; H04W 24/10; H04W 72/21; H04L 5/0048; H04L 5/14
See application file for complete search history.

(56) References Cited

U.S. PATENT DOCUMENTS

| | | | |
|---|---|---|---|
| 9,654,206 B1 * | 5/2017 | Johnson | ............ H04B 7/18584 |
| 10,700,766 B2 | 6/2020 | Khandani | |
| 11,140,695 B1 * | 10/2021 | Eyuboglu | ........... H04W 72/535 |

(Continued)

OTHER PUBLICATIONS

International Search Report and Written Opinion—PCT/US2021/032880—ISA/EPO—Oct. 21, 2021.

(Continued)

*Primary Examiner* — Fahmida S Chowdhury
(74) *Attorney, Agent, or Firm* — Harrity & Harrity, LLP

(57) ABSTRACT

Various aspects of the present disclosure generally relate to wireless communication. In some aspects, a first wireless node may determine, from a plurality of beams associated with the first wireless node, a set of suitable uplink beams and a set of suitable downlink beams, wherein the set of suitable UL beams and the set of suitable DL beams are suitable for full duplex communications, and transmit, to a second wireless node, an indication of the set of suitable uplink beams and the set of suitable downlink beams. Numerous other aspects are provided.

20 Claims, 13 Drawing Sheets

(56) References Cited

U.S. PATENT DOCUMENTS

| | | | |
|---|---|---|---|
| 11,206,549 B1* | 12/2021 | Eyuboglu | H04J 11/0073 |
| 11,271,699 B1* | 3/2022 | Eyuboglu | H04L 1/1819 |
| 11,375,527 B1* | 6/2022 | Eyuboglu | H04B 7/15528 |
| 2009/0213765 A1 | 8/2009 | Rinne et al. | |
| 2012/0250526 A1 | 10/2012 | Zhao et al. | |
| 2013/0044621 A1 | 2/2013 | Jung et al. | |
| 2013/0242771 A1 | 9/2013 | Ohta et al. | |
| 2015/0280887 A1 | 10/2015 | Ko et al. | |
| 2016/0127114 A1* | 5/2016 | Kim | H04B 17/345 370/252 |
| 2017/0195107 A1* | 7/2017 | Liu | H04L 27/2602 |
| 2017/0302337 A1 | 10/2017 | Liu et al. | |
| 2018/0083679 A1* | 3/2018 | Lim | H04B 17/336 |
| 2018/0205533 A1* | 7/2018 | Lee | H04L 5/0023 |
| 2019/0260485 A1* | 8/2019 | Byun | H04W 4/40 |
| 2020/0059283 A1 | 2/2020 | Venugopal et al. | |
| 2020/0059398 A1 | 2/2020 | Pan et al. | |
| 2020/0313779 A1 | 10/2020 | Kim et al. | |
| 2021/0176741 A1* | 6/2021 | Feng | H04W 72/0446 |
| 2021/0194564 A1* | 6/2021 | Xu | H04L 5/0044 |
| 2021/0368369 A1 | 11/2021 | Zhang et al. | |
| 2022/0029761 A1* | 1/2022 | Su | H04L 27/2613 |
| 2022/0182160 A1 | 6/2022 | Su et al. | |
| 2022/0286188 A1* | 9/2022 | Bar-Or Tillinger | H04W 72/53 |
| 2022/0352962 A1* | 11/2022 | Huang | H04L 5/0048 |
| 2023/0118586 A1* | 4/2023 | Huang | H04B 7/063 370/277 |
| 2024/0064545 A1* | 2/2024 | Zhang | H04L 5/0092 |

OTHER PUBLICATIONS

Partial International Search Report—PCT/US2021/032880—ISA/EPO—Aug. 31, 2021.

* cited by examiner

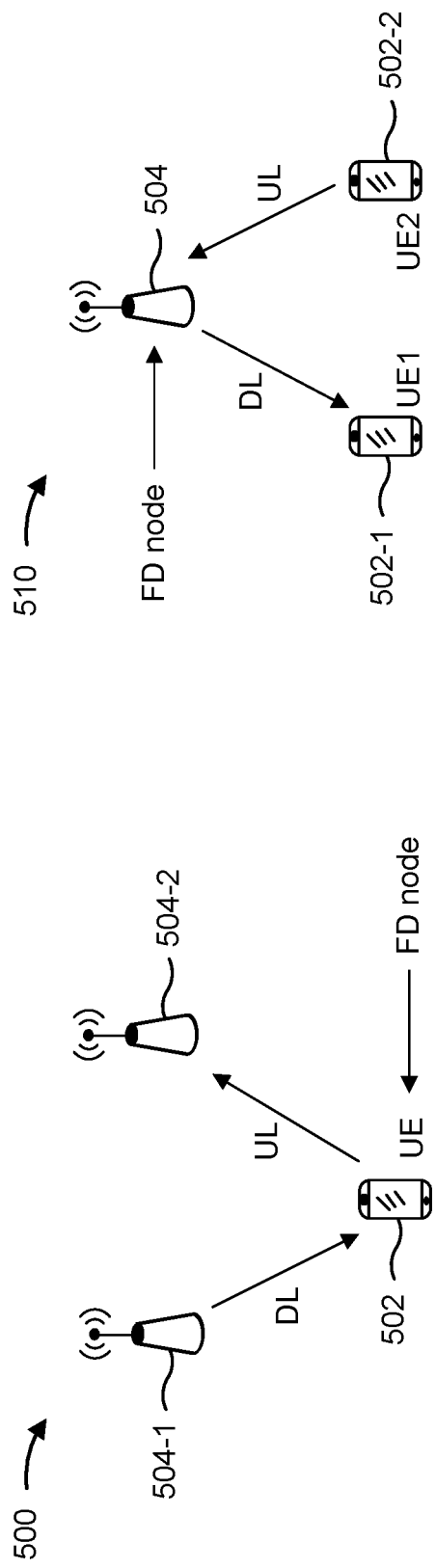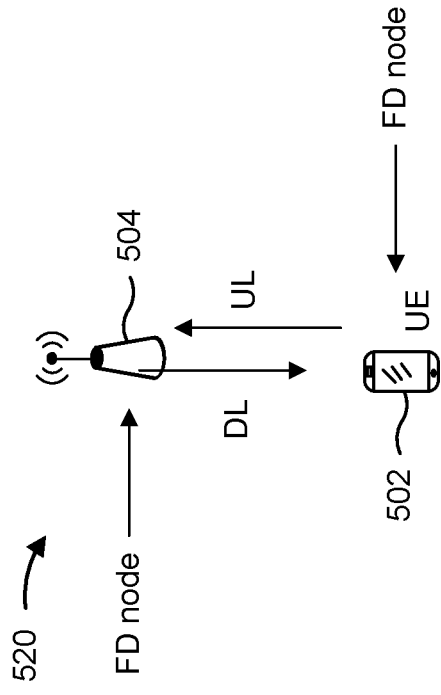
FIG. 5A
FIG. 5B
FIG. 5C

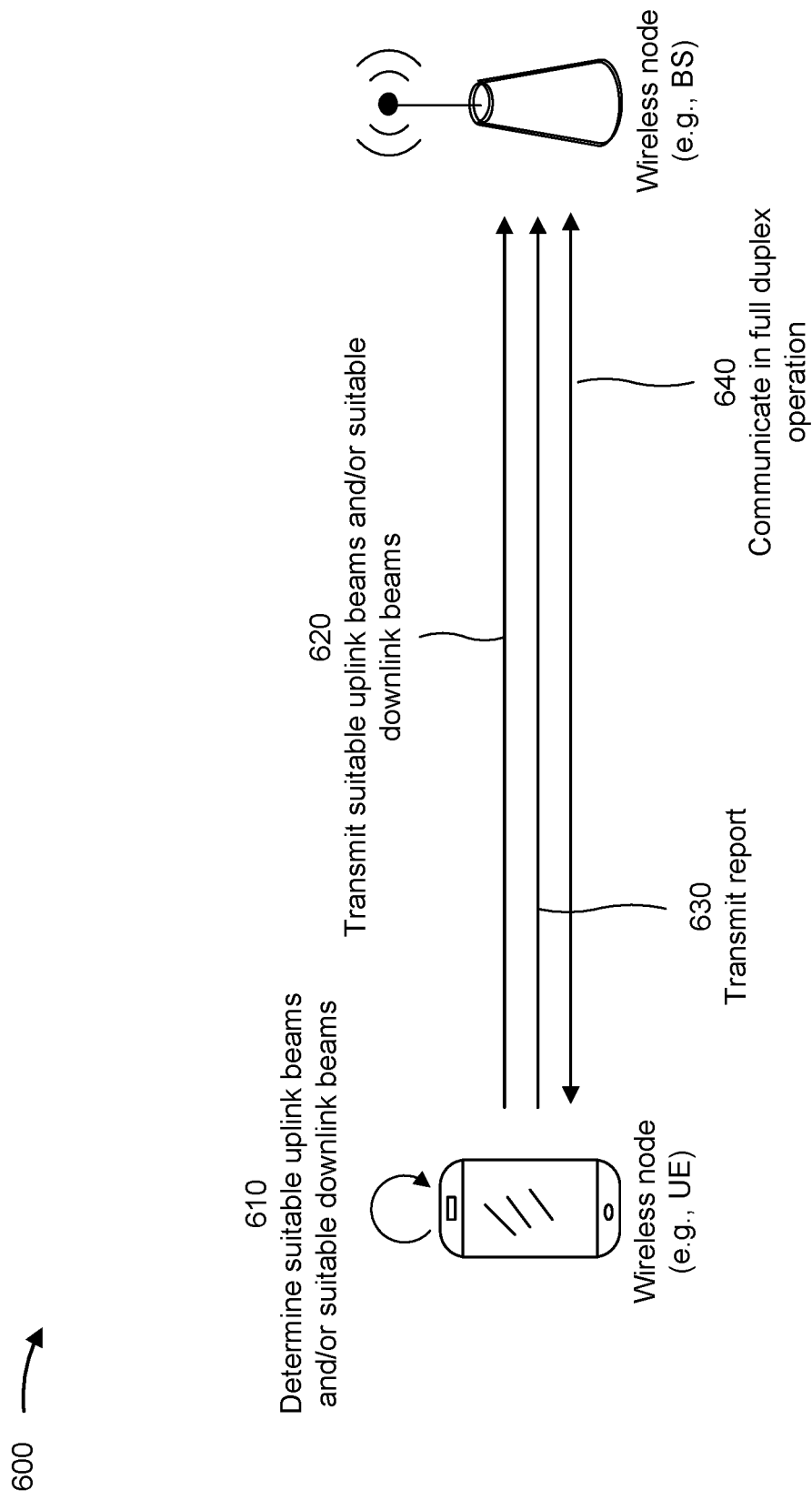

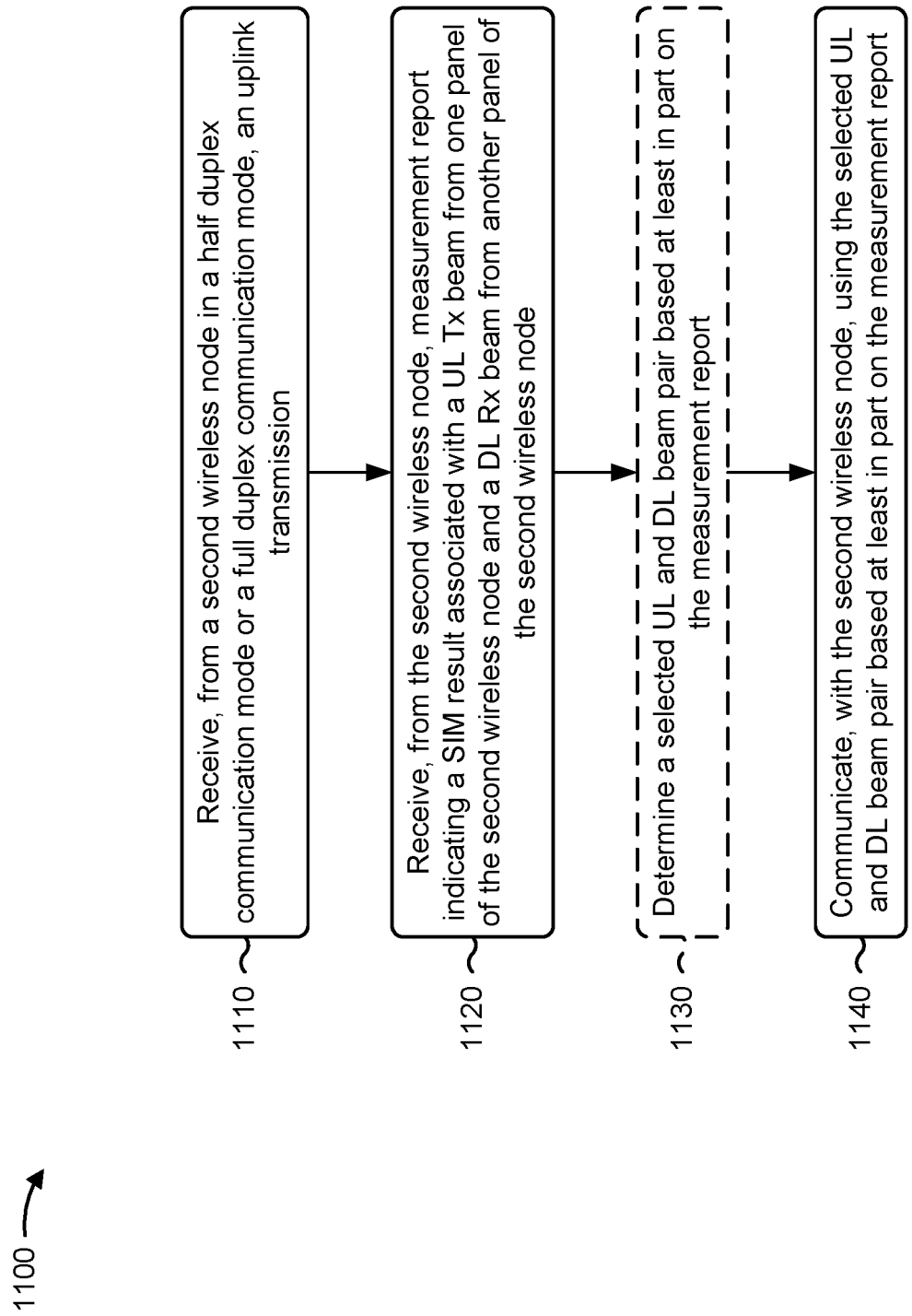

WIRELESS NODE SELF-INTERFERENCE MEASUREMENTS AND UPLINK BEAM MANAGEMENT FOR FULL DUPLEX TRANSMISSIONS

CROSS-REFERENCE TO RELATED APPLICATIONS

This application is a divisional of U.S. patent application Ser. No. 17/322,437, filed May 17, 2021, entitled "WIRELESS NODE SELF-INTERFERENCE MEASUREMENTS AND UPLINK BEAM MANAGEMENT FOR FULL DUPLEX TRANSMISSIONS," which claims priority to U.S. Provisional Patent Application No. 63/027,743, filed on May 20, 2020, entitled "WIRELESS NODE ASSISTED SELF-INTERFERENCE MEASUREMENT AND/OR UPLINK BEAM MANAGEMENT FOR FULL DUPLEX TRANSMISSIONS," and assigned to the assignee hereof, and to U.S. Provisional Patent Application No. 63/027,745, filed on May 20, 2020, entitled "WIRELESS NODE AUTONOMOUS SELF-INTERFERENCE MEASUREMENTS FOR FULL DUPLEX OPERATION," and assigned to the assignee hereof. The contents of which are incorporated herein by reference in their entireties.

FIELD OF THE DISCLOSURE

Aspects of the present disclosure generally relate to wireless communication and to techniques and apparatuses for wireless node self-interference measurements (SIMs) and uplink beam management for full duplex transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

For example, full duplex communication may provide improvements in LTE, NR, and other radio access technologies by enabling contemporaneous uplink and downlink communication by a single wireless device using the same resources. Full duplex communication may provide a reduction in latency, enhanced spectral efficiency per cell or per UE, and more efficient resource utilization.

SUMMARY

In some aspects, a method of wireless communication, performed by a first wireless node, may include transmitting, to a second wireless node, an indication of a set of suitable uplink (UL) beams and a set of suitable downlink (DL) beams from a plurality of beams associated with the first wireless node, where the set of suitable UL beams and the set of suitable DL beams are suitable for full duplex communications; and communicating with the second wireless node based at least in part on the indication of the set of suitable UL beams and the set of suitable DL beams.

In some aspects, a method of wireless communication, performed by a first wireless node, may include receiving, from a second wireless node, an indication of a set of suitable UL beams and a set of suitable DL beams for the second wireless node, wherein the set of suitable UL beams and the set of suitable DL beams are suitable for full duplex communications; and communicating with the second wireless node based at least in part on the indication of the set of suitable UL beams and the set of suitable DL beams.

In some aspects, a first wireless node for wireless communication may include a memory and one or more processors coupled to the memory. The one or more processors may be configured to transmit, to a second wireless node, an indication of a set of suitable UL beams and a set of suitable DL beams from a plurality of beams associated with the first wireless node, where the set of suitable UL beams and the set of suitable DL beams are suitable for full duplex communications; and communicate with the second wireless node based at least in part on the indication of the set of suitable UL beams and the set of suitable DL beams.

In some aspects, a first wireless node for wireless communication may include a memory and one or more processors coupled to the memory. The one or more processors may be configured to receive, from a second wireless node, an indication of a set of suitable UL beams and a set of suitable DL beams for the second wireless node, wherein the set of suitable UL beams and the set of suitable DL beams are suitable for full duplex communications; and communicate with the second wireless node based at least in part on the indication of the set of suitable UL beams and the set of suitable DL beams.

In some aspects, a non-transitory computer-readable medium may store one or more instructions for wireless communication. The one or more instructions, when executed by one or more processors of a first wireless node, may cause the one or more processors to transmit, to a second wireless node, an indication of a set of suitable UL beams and a set of suitable DL beams from a plurality of beams associated with the first wireless node, where the set of suitable UL beams and the set of suitable DL beams are suitable for full duplex communications; and communicate with the second wireless node based at least in part on the indication of the set of suitable UL beams and the set of suitable DL beams.

In some aspects, a non-transitory computer-readable medium may store one or more instructions for wireless communication. The one or more instructions, when executed by one or more processors of a first wireless node, may cause the one or more processors to receive, from a second wireless node, an indication of a set of suitable UL beams and a set of suitable DL beams for the second wireless node, wherein the set of suitable UL beams and the set of suitable DL beams are suitable for full duplex communications; and communicate with the second wireless node based at least in part on the indication of the set of suitable UL beams and the set of suitable DL beams.

In some aspects, an apparatus for wireless communication may include means for transmitting, to a wireless node, an indication of a set of suitable UL beams and a set of suitable DL beams from a plurality of beams associated with the apparatus, where the set of suitable UL beams and the set of suitable DL beams are suitable for full duplex communications; and means for communicating with the wireless node based at least in part on the indication of the set of suitable UL beams and the set of suitable DL beams.

In some aspects, an apparatus for wireless communication may include means for receiving, from a wireless node, an indication of a set of suitable UL beams and a set of suitable DL beams for the wireless node, wherein the set of suitable UL beams and the set of suitable DL beams are suitable for full duplex communications; and means for communicating with the wireless node based at least in part on the indication of the set of suitable UL beams and the set of suitable DL beams.

In some aspects, a method of wireless communication, performed by a first wireless node, may include transmitting, in a half duplex communication mode or a full duplex communication mode, a UL transmission; performing, using the uplink transmission, a self-interference measurement (SIM) associated with a UL transmit (Tx) beam from one panel of the first wireless node and a DL receive (Rx) beam from another panel of the first wireless node; and transmitting, to a second wireless node, a measurement report indicating a result of the SIM.

In some aspects, a method of wireless communication, performed by a first wireless node, may include receiving, from a second wireless node in a half duplex communication mode or a full duplex communication mode, a UL transmission; receiving, from the second wireless node, measurement report indicating a SIM result associated with a UL Tx beam from one panel of the second wireless node and a DL Rx beam from another panel of the second wireless node; and communicating, with the second wireless node, using a selected UL and DL beam pair based at least in part on the measurement report.

In some aspects, a first wireless node for wireless communication may include a memory and one or more processors coupled to the memory. The one or more processors may be configured to transmit, in a half duplex communication mode or a full duplex communication mode, a UL transmission; perform, using the UL transmission, a SIM associated with a UL Tx beam from one panel of the first wireless node and a DL Rx beam from another panel of the first wireless node; and transmit, to a second wireless node, a measurement report indicating a result of the SIM.

In some aspects, a first wireless node for wireless communication may include a memory and one or more processors coupled to the memory. The one or more processors may be configured to receive, from a second wireless node in a half duplex communication mode or a full duplex communication mode, a UL transmission; receive, from the second wireless node, measurement report indicating a SIM result associated with a UL Tx beam from one panel of the second wireless node and a DL Rx beam from another panel of the second wireless node; and communicate, with the second wireless node, using a selected UL and DL beam pair based at least in part on the measurement report.

In some aspects, a non-transitory computer-readable medium may store one or more instructions for wireless communication. The one or more instructions, when executed by one or more processors of a first wireless node, may cause the one or more processors to transmit, in a half duplex communication mode or a full duplex communication mode, a UL transmission; perform, using the UL transmission, a SIM associated with a UL Tx beam from one panel of the first wireless node and a DL Rx beam from another panel of the first wireless node; and transmit, to a second wireless node, a measurement report indicating a result of the SIM.

In some aspects, a non-transitory computer-readable medium may store one or more instructions for wireless communication. The one or more instructions, when executed by one or more processors of a first wireless node, may cause the one or more processors to receive, from a second wireless node in a half duplex communication mode or a full duplex communication mode, a UL transmission; receive, from the second wireless node, measurement report indicating a SIM result associated with a UL Tx beam from one panel of the second wireless node and a DL Rx beam from another panel of the second wireless node; and communicate, with the second wireless node, using a selected UL and DL beam pair based at least in part on the measurement report.

In some aspects, an apparatus for wireless communication may include means for transmitting, in a half duplex communication mode or a full duplex communication mode, a UL transmission; means for performing, using the UL transmission, a SIM associated with a UL Tx beam from one panel of the apparatus and a DL Rx beam from another panel of the apparatus; and means for transmitting, to a wireless node, a measurement report indicating a result of the SIM.

In some aspects, an apparatus for wireless communication may include means for receiving, from a wireless node in a half duplex communication mode or a full duplex communication mode, a UL transmission; means for receiving, from the wireless node, measurement report indicating a SIM result associated with a UL Tx beam from one panel of the wireless node and a DL Rx beam from another panel of the wireless node; and means for communicating, with the wireless node, using a selected UL and DL beam pair based at least in part on the measurement report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5C are diagrams illustrating examples of full duplex communication, in accordance with the disclosure.

FIG. 6 is a diagram illustrating an example associated with wireless node assisted self-interference measurement (SIM) and/or uplink beam management for full duplex transmissions, in accordance with the present disclosure.

FIGS. 8-11 are diagrams illustrating example processes associated with wireless node SIMs and uplink beam management for full duplex transmissions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
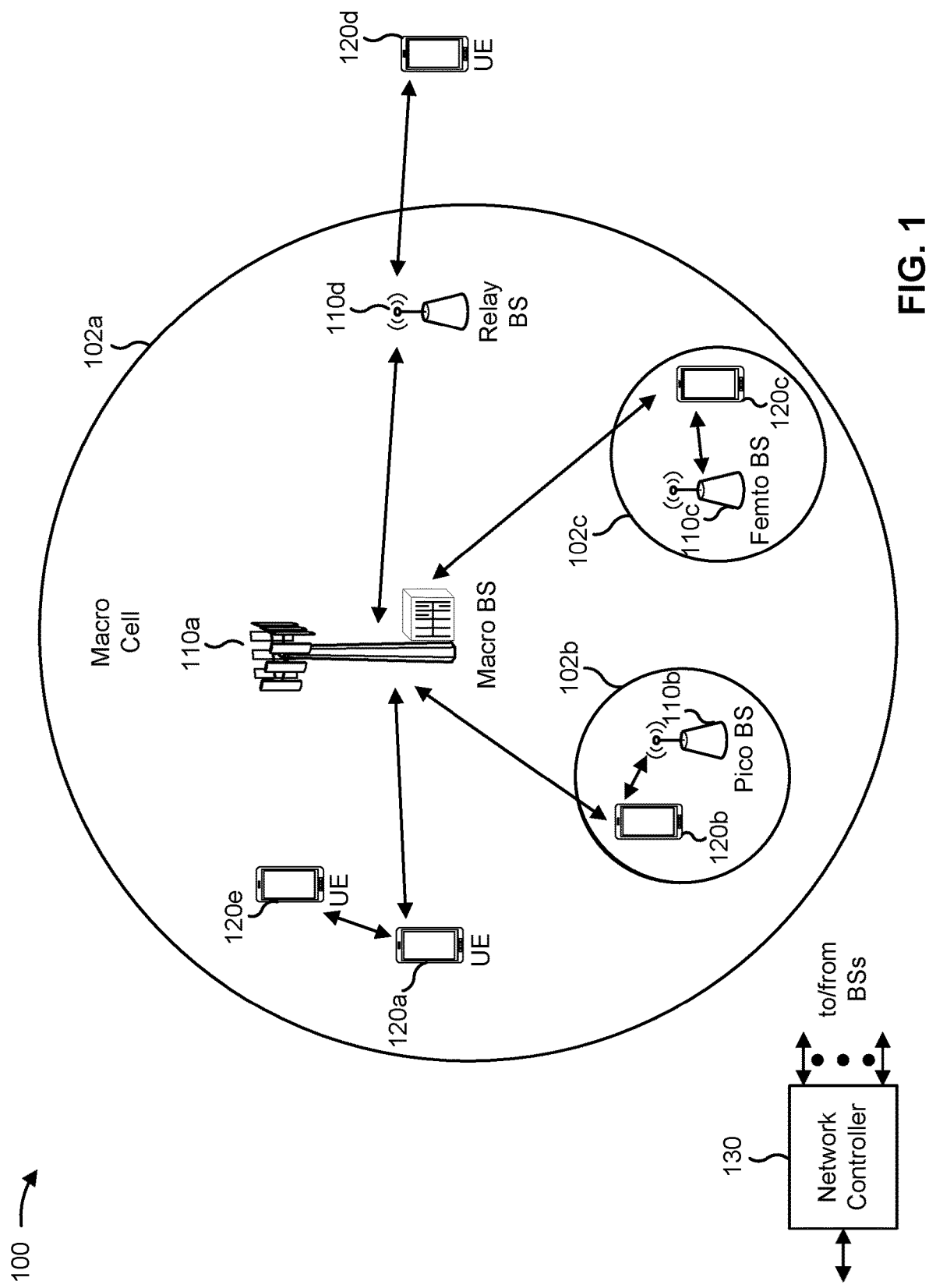
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a TRP, or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
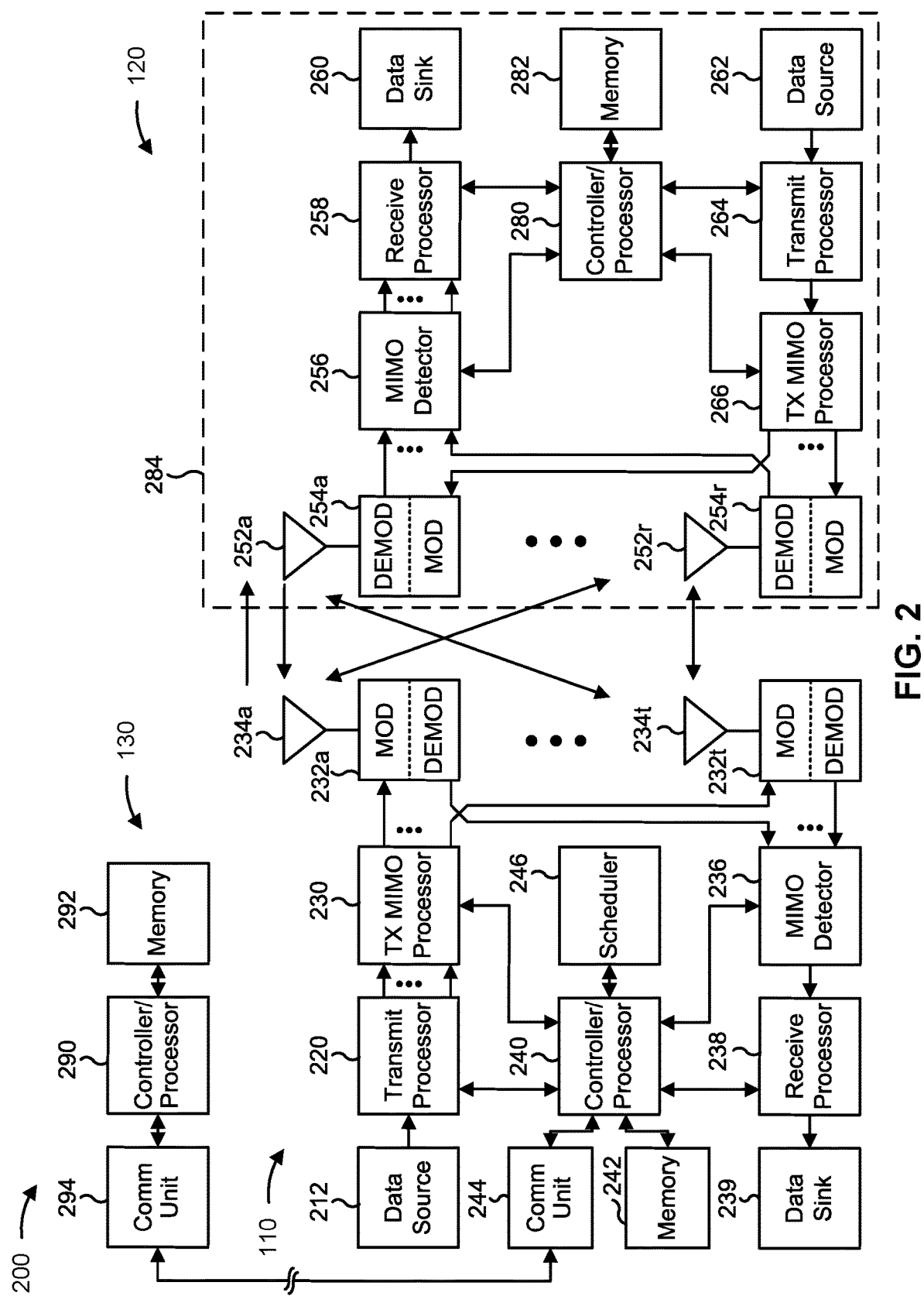
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-8).

Controller/processor 240 of base station 110, controller/processor 280 of UE 120, and/or any other component(s) of FIG. 2 may perform one or more techniques associated with wireless node self-interference measurements (SIMs) and uplink beam management for full duplex transmissions, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a first wireless node (e.g., a UE 120 or another wireless node) may include means for determining, from a plurality of beams associated with the first wireless node, a set of suitable uplink (UL) beams and a set of suitable downlink (DL) beams, wherein the set of suitable UL beams and the set of suitable DL beams are suitable for full duplex communications, means for transmitting, to a second wireless node, an indication of the set of suitable UL beams and the set of suitable DL beams from a plurality of beams associated with the first wireless node, where the set of suitable UL beams and the set of suitable DL beams are suitable for full duplex communications; and/or means for communicating with the second wireless node based at least in part on the indication of the set of suitable UL beams and the set of suitable DL beams; among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a first wireless node (e.g., a base station 110 or another wireless node) may include means for receiving, from a second wireless node, an indication of a set of suitable UL beams and a set of suitable DL beams for the second wireless node, wherein the set of suitable UL beams and the set of suitable DL beams are suitable for full duplex communications; and/or means for communicating with the second wireless node based at least in part on the indication of the set of suitable UL beams and the set of suitable DL beams; among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a first wireless node (e.g., a UE 120 or another wireless node) may include means for transmitting, in a half duplex communication mode or a full duplex communication mode, an uplink transmission; means for performing, using the uplink transmission, a SIM associated with a UL transmit (Tx) beam from one panel of the first wireless node and a DL receive (Rx) beam from another panel of the first wireless node; and/or means for transmitting, to a second wireless node, a measurement report indicating a result of the SIM; among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a first wireless node (e.g., a base station 110 or another wireless node) may include means for receiving, from a second wireless node in a half duplex communication mode or a full duplex communication mode, an uplink transmission; means for receiving, from the second wireless node, measurement report indicating a SIM result associated with a UL Tx beam from one panel of the second wireless node and a DL Rx beam from another panel of the second wireless node; means for determining a selected UL and DL beam pair based at least in part on the measurement report; and/or means for communicating, with the second wireless node, using the selected UL and DL beam pair based at least in part on the measurement report; among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
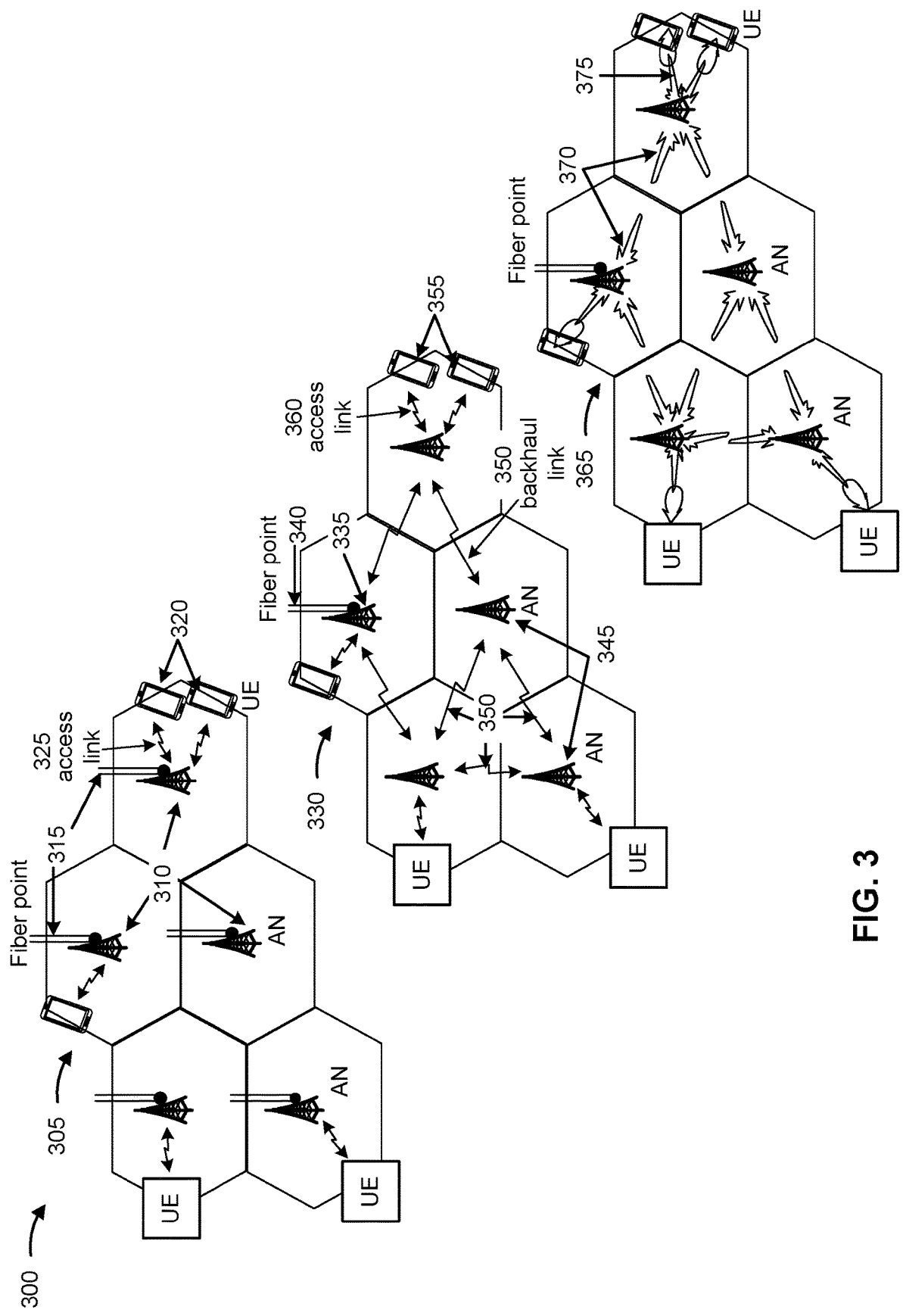
FIG. 3 is a diagram illustrating examples of radio access networks, in accordance with the disclosure.

FIG. 3 is a diagram illustrating examples 300 of radio access networks, in accordance with the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, a UE that is directly in communication with a base station (e.g., an anchor base station or a non-anchor base station) may be referred to as an anchor node.

As indicated above, FIG. 3 is provided as an example. Other examples may differ from what is described with regard to FIG. 3.

Figure 4:
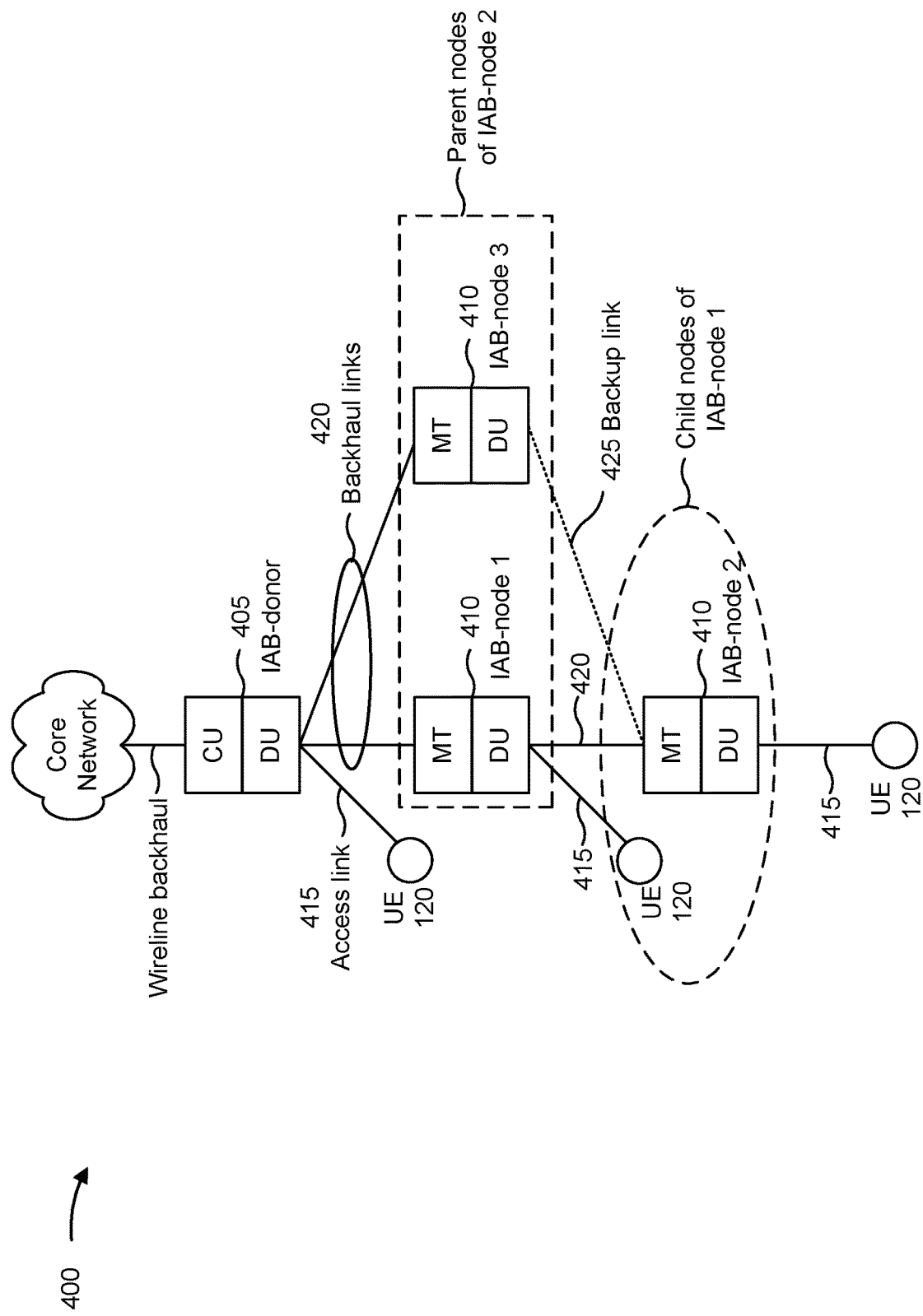
FIG. 4 is a diagram illustrating an example of an integrated access and backhaul network architecture, in accordance with the disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405.

Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (FLAP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, an IAB donor 405 or an IAB node 410 may be referred to as a node or a wireless node.

As indicated above, FIG. 4 is provided as an example. Other examples may differ from what is described with regard to FIG. 4.

FIGS. 5A-5C are diagrams illustrating examples 500, 510, 520 of full duplex (FD) communication. As shown in FIGS. 5A-5C, examples 500, 510, 520 include one or more UEs 502 in communication with one or more base stations 504, TRPs 504, and/or the like in a wireless network that supports full duplex communication. However, it will be appreciated that the devices shown in FIGS. 5A-5C are exemplary only, and that the wireless network may support full duplex communication between other devices (e.g., between a UE and a base station or TRP, between a mobile termination node and a control node, between an IAB child node and an IAB parent node, between a scheduled node and a scheduling node, and/or the like).

As shown in FIG. 5A, example 500 includes a UE 502 in communication with two base stations (e.g., TRPs) 504-1, 504-2. As shown in FIG. 5A, the UE 502 may transmit one or more uplink transmissions to base station 504-1 and may concurrently receive one or more downlink transmission from base station 504-2. Accordingly, in the example 500 shown in FIG. 5A, full duplex communication is enabled for the UE 502, which may be operating as a full duplex node, but not for the base stations 504-1, 504-2, which may be operating as half duplex nodes. Additionally, or alternatively, as shown in FIG. 5B, example 510 includes two UEs, UE1 502-1 and UE2 502-2 in communication with a base station 504. In this case, the base station 504 may transmit one or more downlink transmissions to the UE1 502-1 and may concurrently receive one or more uplink transmissions from the UE2 502-2. Accordingly, in the example 510 shown in FIG. 5B, full duplex communication is enabled for the base station 504, which may be operating as a full duplex node, but not for the UE1 502-1 and UE2 502-2, which may be operating as half duplex nodes. Additionally, or alternatively, as shown in FIG. 5C, example 520 includes a UE 502 in communication with a base station 504. In this case, the base station 504 may transmit, and the UE 502 may receive, one or more downlink transmissions concurrently with the UE 502 transmitting, and the base station 504 receiving, one or more uplink transmissions. Accordingly, in the example 520 shown in FIG. 5C, full duplex communication is enabled for both the UE 502 and the base station 504, each of which is operating as a full duplex node.

The present disclosure generally relates to improving the manner in which flexible time-division duplexing (TDD) operates to support full duplex communication, which generally refers to simultaneous uplink and downlink transmissions in FR2, in wireless networks that support beamformed communication, and/or the like. In some aspects, flexible TDD capabilities that support full duplex communication may be present at a scheduling node (e.g., a base station, a TRP, a control node, a parent node, and/or the like), a scheduled node (e.g., a UE, an MT node, a child node, and/or the like), or both. For example, at a UE, uplink transmission may be from one antenna panel and downlink reception may be in another antenna panel. In general, full duplex communication may be conditional on a beam separation of an uplink beam and a downlink beam at the respective antenna panels. Accordingly, improving the manner in which the uplink beam and the downlink beam are selected to enable full duplex communication is desirable. Utilizing full duplex communication may provide reduced latency by allowing a full duplex node to transmit or receive a downlink signal in an uplink-only slot, or to transmit or receive an uplink signal in a downlink-only slot, which may enable latency savings. In addition, full duplex communication may enhance spectral efficiency or throughput per cell or per UE, may enable more efficient resource utilization by simultaneously utilizing time and frequency resources for uplink and downlink communication, and/or the like.

As described above, full duplex communication may be conditional depending on beam separation between uplink and downlink beams to assist in limiting or reducing self-interference that may occur during full duplex communication. In other words, full duplex communication may be restricted to not use certain uplink and downlink beam pairs that may result in self-interference, which may occur when a transmitted signal leaks into a receive port, when an object reflects a transmitted signal back to a receive port (e.g., causing a clutter echo effect), among other examples. Accordingly, whether full duplex communication can be performed may be dependent on selecting suitable uplink and downlink beam pairs (e.g., transmit and receive beams that are on different antenna panels) to reduce or minimize self-interference (especially clutter echo) via spatial isolation. In some examples, determining the uplink and downlink beams that are separated on respective antenna panels may provide a reliable full duplex communication by selecting beam pairs that minimize or reduce self-interference.

Accordingly, measuring self-interference at a wireless node having full duplex capabilities may assist in determining uplink and downlink beam pairs that may support full duplex communication. For example, a UE, and/or an IAB child node, among other examples, may obtain self-interference measurements to determine one or more candidate uplink transmit beams that can be paired with one or more candidate downlink receive beams. Additionally, or alternatively, a base station, and/or an IAB parent node, among other examples, may obtain self-interference measurements to determine one or more candidate uplink receive beams that can be paired with one or more candidate downlink transmit beams. In general, to obtain the self-interference measurements, a wireless node with full duplex capabilities may transmit a signal from a first set of antennas in one or more transmit beam directions, and the wireless node may concurrently measure a received signal (e.g., a reflected or leaked transmit signal) on a second set of antennas in one or more receive beam directions, where the first set of antennas may be different from or the same as the second set of antennas.

Some aspects described herein relate to techniques and apparatuses that enable a wireless node (e.g., a UE, an MT, a child node, and/or the like) to assist in uplink beam management for full duplex transmissions. For example, the wireless node may determine, from a plurality of beams associated with the wireless node, suitable uplink beams and suitable downlink beams. The wireless node may transmit an indication of the suitable uplink beams and the suitable downlink beams to another wireless node (e.g., a base station, an IAB donor, a parent node, and/or a control node). The wireless node and the other wireless node may perform SIM and/or uplink beam management based at least in part on the indication of the suitable uplink beams and the suitable downlink beams. In this way, the wireless node may identify one or more beams suited for uplink transmissions and one or more beams suited for downlink receptions prior to performing a full SIM and/or uplink beam management procedure (e.g., before performing a full SIM procedure across all beams associated with the wireless node). In this way, the wireless node may assist the other wireless node in finding one or more candidate downlink receive and uplink transmit beam pair(s) for full duplex transmissions. This may enable a more efficient SIM and/or uplink beam management procedure and may conserve resources that would have otherwise been used associated with performing the SIM and/or uplink beam management for all of the beams associated with the wireless node.

Additionally, or alternatively, some aspects described herein relate to techniques and apparatuses enable a wireless node (e.g., a UE, an MT, and/or a child node) to autonomously perform a SIM to assist in determining uplink and downlink beam pairs that may support full duplex communication. In some aspects, the wireless node may autonomously perform the SIM based at least in part on a limited configuration received from another wireless node (e.g., a base station, control node, a parent node, a scheduling node, and/or an IAB donor node). As a result, latency associated with performing the SIM and determining the uplink and downlink beam pairs that may support full duplex communication may be reduced. Additionally, overhead associated with configuration signaling for SIM procedures may be reduced by enabling the wireless node to autonomously perform a SIM.

As indicated above, FIGS. 5A-5C are provided as one or more examples. Other examples may differ from what is described with regard to FIGS. 5A-5C.

FIG. 6 is a diagram illustrating an example 600 associated with wireless node assisted SIM and/or uplink beam management for full duplex transmissions, in accordance with the present disclosure. As shown in FIG. 6, example 600 includes a first wireless node in communication with a second wireless node in a wireless network (e.g., wireless network 100, radio access network 305, 330, 365, and/or the like). In some aspects, as shown in FIG. 6, the first wireless node may be a UE (e.g., UE 120, and/or UE 502) and the second wireless node may be a base station (e.g., base station 110, and/or base station 504). Additionally, or alternatively, in some aspects, the first wireless node and the second wireless node may correspond to other suitable devices that can communicate on an uplink and a downlink (e.g., the first wireless node may correspond to an MT node, a child node, and/or a scheduled node, among other examples, and the second wireless node may correspond to a control node, a parent node, a scheduling node, and/or an IAB donor node, among other examples).

As shown by reference number 610, the first wireless node may determine one or more suitable uplink beams and/or one or more suitable downlink beams associated with the first wireless node. The first wireless node may be associated with a plurality of beams. For example, the first wireless node may include one or more antenna panels for transmitting or receiving signals via one or more beams. An antenna panel may be associated with one or more beams. A beam may be capable of transmitting a signal to another wireless node (e.g., an uplink transmission) and/or receiving a signal from another wireless node (e.g., a downlink transmission). In this way, a beam may be capable of functioning as an uplink beam and/or as a downlink beam.

The first wireless node may determine, from the plurality of beams associated with the first wireless node, a set (e.g., one or more) of suitable uplink beams and/or a set (e.g., one or more) of suitable downlink beams. A beam may be suitable for uplink and/or suitable for downlink (e.g., some beams may be only suitable for uplink, some beams may be only suitable for downlink, and some beams may be suitable for both uplink and downlink). The first wireless node may determine that a beam is suitable for at least one of uplink transmission or downlink reception based at least in part on a maximum permissible exposure (MPE) limit associated with the beam (or associated with an antenna panel associated with the beam), an antenna panel of the first wireless node associated with the beam, a full duplex capability of the first wireless node, a channel associated with a downlink and the uplink beam pair, and/or a transmit power associated with the beam, among other examples.

For example, when transmitting in the millimeter wave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for millimeter wave communications as compared to sub-6 GHz communications. To improve safety, some governing bodies have placed restrictions on the peak EIRP that can be directed toward the human body. These restrictions may be referred to as MPE limits, MPE constraints, and/or the like. In some aspects, an MPE limit may be due to a hand blocking scenario, where a hand of a user of the first wireless node blocks or obstructs communications to and/or from an antenna panel of the first wireless node, or is otherwise positioned near the antenna panel. Additionally, or alternatively, the MPE limit may be due to the position of another body part of the user, such as the user's face, head, ear, and/or leg, among other examples. When the first wireless node is subject to an MPE limit, a beam may be suitable as a downlink beam for use by the first wireless node to communicate with the second wireless node, but the beam may not be permitted for use as an uplink beam due to the MPE limit. The first wireless node may determine a set of suitable uplink beams and/or a set of suitable downlink beams based at least in part on an MPE limit associated with the beam. In some aspects, the first wireless node may determine that a beam group (e.g., a group of beams associated with a same antenna panel of the first wireless node) is suitable for uplink and/or suitable for downlink based at least in part on an MPE limit associated with the beam group.

In some aspects, the first wireless device may be configured with a full duplex transmit/receive (Tx/Rx) capability. The full duplex Tx/Rx capability of the first wireless node may change dynamically based at least in part on whether the first wireless node is operating with an enabled full duplex capability or a disabled full duplex capability. The full duplex Tx/Rx capability may indicate suitable uplink beams and/or suitable downlink beams for full duplex communication. The first wireless node may determine a set of suitable uplink beams and/or a set of suitable downlink beams based at least in part on a full duplex Tx/Rx capability associated with the beam. In some aspects, the first wireless node may determine that a beam group (e.g., a group of beams associated with a same antenna panel of the first wireless node and/or the like) is suitable for uplink and/or suitable for downlink based at least in part on a full duplex Tx/Rx capability associated with the beam group.

In some aspects, the first wireless node may determine the set of suitable uplink beams and/or the set of suitable downlink beams prior to establishing full duplex communication with the second wireless node. That is, the first wireless node may determine the set of suitable uplink beams and/or the set of suitable downlink beams prior to performing a full SIM procedure (e.g., across all beams associated with the first wireless node). In some aspects, the first wireless node may determine the set of suitable uplink beams and/or the set of suitable downlink beams after establishing full duplex communication with the second wireless node. For example, a beam may experience a change in an operating condition (e.g., an MPE limit, a Tx/Rx full duplex capability, a channel of an uplink and downlink beam pair, a transmit power of a beam, and/or the like) while the first wireless node is in full duplex operation. The change in operating condition may cause the beam to no longer be suitable for uplink and/or no longer suitable for downlink. The first wireless node may determine an updated set of suitable uplink beams and/or an updated set of suitable downlink beams based at least in part on one or more beams experiencing a change in an operating condition.

As shown by reference number 620, the first wireless node may transmit an indication of the set of suitable uplink beams and/or the set of suitable downlink beams to the second wireless node. In some aspects, the first wireless node may transmit the indication in a semi-persistent manner (e.g., using RRC signaling). In some aspects, the first wireless node may transmit the indication dynamically (e.g., using uplink control signaling). The first wireless node may dynamically transmit the indication based at least in part on determining a change in an operating condition of one or more beams. In some aspects, the first wireless node may dynamically transmit the indication based at least in part on determining a change in the set of suitable uplink beams and/or determining a change in the set of suitable downlink beams.

The second wireless node may be enabled to determine which beams (or beam groups) of the first wireless node are suitable for uplink and which beams (or beam groups) of the first wireless node are suitable for downlink based at least in part on receiving the indication from the first wireless node. This may be beneficial for uplink beam management as the second wireless node may be enabled to ignore, skip, prioritize, and/or the like certain beams when selecting an uplink and downlink beam pair for full duplex communication based at least in part on receiving the indication of the set of suitable uplink beams and/or the set of suitable downlink beams.

As shown by reference number 630, the first wireless node may transmit, to the second wireless node, a report indicating candidate downlink receive beam and uplink transmit beam pair(s) suitable for full duplex operation. The report may be a SIM report. For example, the first wireless node may perform a cross panel SIM associated with an uplink transmit beam, from the set of suitable uplink beams, from one antenna panel of the first wireless node, and a downlink receive beam, from the set of suitable downlink beams, from another antenna panel of the first wireless node.

In some aspects, the first wireless node may perform a SIM sweep (e.g., perform multiple SIMs using different beams as uplink transmit beams and downlink receive beams) based at least in part on the set of suitable uplink beams and the set of suitable downlink beams. That is, the first wireless node may perform multiple SIMs across the beams associated with the first wireless node. The SIM sweep may be a partial SIM sweep. For example, the first wireless node may skip one or more beams when performing the SIM sweep based at least in part on the set of suitable uplink beams and/or the set of suitable downlink beams (e.g., the first wireless node may refrain from performing a SIM associated with a beam as an uplink transmit beam if the beam is not included in the set of suitable uplink beams and/or the first wireless node may refrain from performing a SIM associated with a beam as a downlink receive beam if the beam is not included in the set of suitable downlink beams).

For example, in a case where a first antenna panel of the first wireless node is associated with a beam 1 and a beam 2, and a second antenna panel of the first wireless node is associated with a beam 3 and a beam 4, the set of suitable uplink beams may include beam 1 and beam 2 (e.g., the beams associated with the second antenna panel may not be suitable for uplink). The set of suitable downlink beams may include beam 1, beam 2, beam 3, and beam 4. The partial SIM sweep may include performing a SIM using beam 1 as an uplink transmit beam and beam 3 as a downlink receive beam, a SIM using beam 1 as an uplink transmit beam and beam 4 as a downlink receive beam, a SIM using beam 2 as an uplink transmit beam and beam 3 as a downlink receive beam, and a SIM using beam 2 as an uplink transmit beam and beam 4 as a downlink receive beam. However, the first wireless node may refrain from performing a SIM using a beam associated with the second panel as an uplink transmit beam (e.g., a SIM using beam 3 as an uplink transmit beam and beam 1 as a downlink receive beam and/or the like) based at least in part on determining that the beams associated with the second panel are not suitable for uplink. In this way, the first wireless node may conserve resources that would have otherwise been using performing the SIM sweep using all beams associated with the first wireless node. The first wireless node may transmit the report (e.g., the SIM report) identifying one or more candidate downlink receive and uplink transmit beam pair(s) based at least in part on performing the partial SIM sweep, as described above.

As shown by reference number 640, the first wireless node and the second wireless node may communicate in full duplex operation based at least in part on the report indicating one or more candidate downlink receive and uplink transmit beam pair(s). For example, the second wireless node may determine a selected downlink receive and uplink transmit beam pair based at least in part on the report received from the first wireless node. The second wireless node may determine the selected downlink receive and uplink transmit beam pair based at least in part on the set of suitable uplink beams and/or the set of suitable downlink beams received from the first wireless node (e.g., the second wireless node may refrain from selecting a downlink receive and uplink transmit beam pair if one or both of the beams in the beam pair are not suitable for the identified purpose (e.g., uplink or downlink)).

In some aspects, after transmitting a first set of suitable uplink beams and/or a first set of suitable downlink beams, and while communicating with the second wireless node in full duplex operation, the first wireless node may determine a second set of suitable uplink beams and/or a second set of suitable downlink beams (e.g., based at least in part on determining a change in an operating condition associated with one or more beams, as described above). The first wireless node may transmit, to the second wireless node, an indication of the second set of suitable uplink beams and/or the second set of suitable downlink beams (e.g., dynamically transmitting the indication using uplink control signaling). In some aspects, the first wireless node may perform a partial SIM sweep based at least in part on the second set of suitable uplink beams and/or the second set of suitable downlink beams. The first wireless node may transmit, to the second wireless node, another report indicating one or more new candidate downlink receive and uplink transmit beam pair(s) suitable for full duplex operating based at least in part on performing the partial SIM sweep. The second wireless node may determine a new selected downlink receive and uplink transmit beam pair based at least in part on receiving the other report.

In this way, the first wireless node may assist in SIM and/or uplink beam management for full duplex transmissions by determining suitable uplink beams and/or suitable downlink beams prior to entering into full duplex operation and/or while communicating in full duplex operation. For example, the first wireless node may perform one or more SIM operations based at least in part on determining suitable uplink beams and/or suitable downlink beams for full duplex transmissions. This may enable a more efficient uplink beam management procedure and may conserve resources that would have otherwise been used associated with performing the SIM and/or uplink beam management for all of the beams associated with the first wireless node.

As indicated above, FIG. 6 is provided as an example. Other examples may differ from what is described with respect to FIG. 6.

Figure 7A:
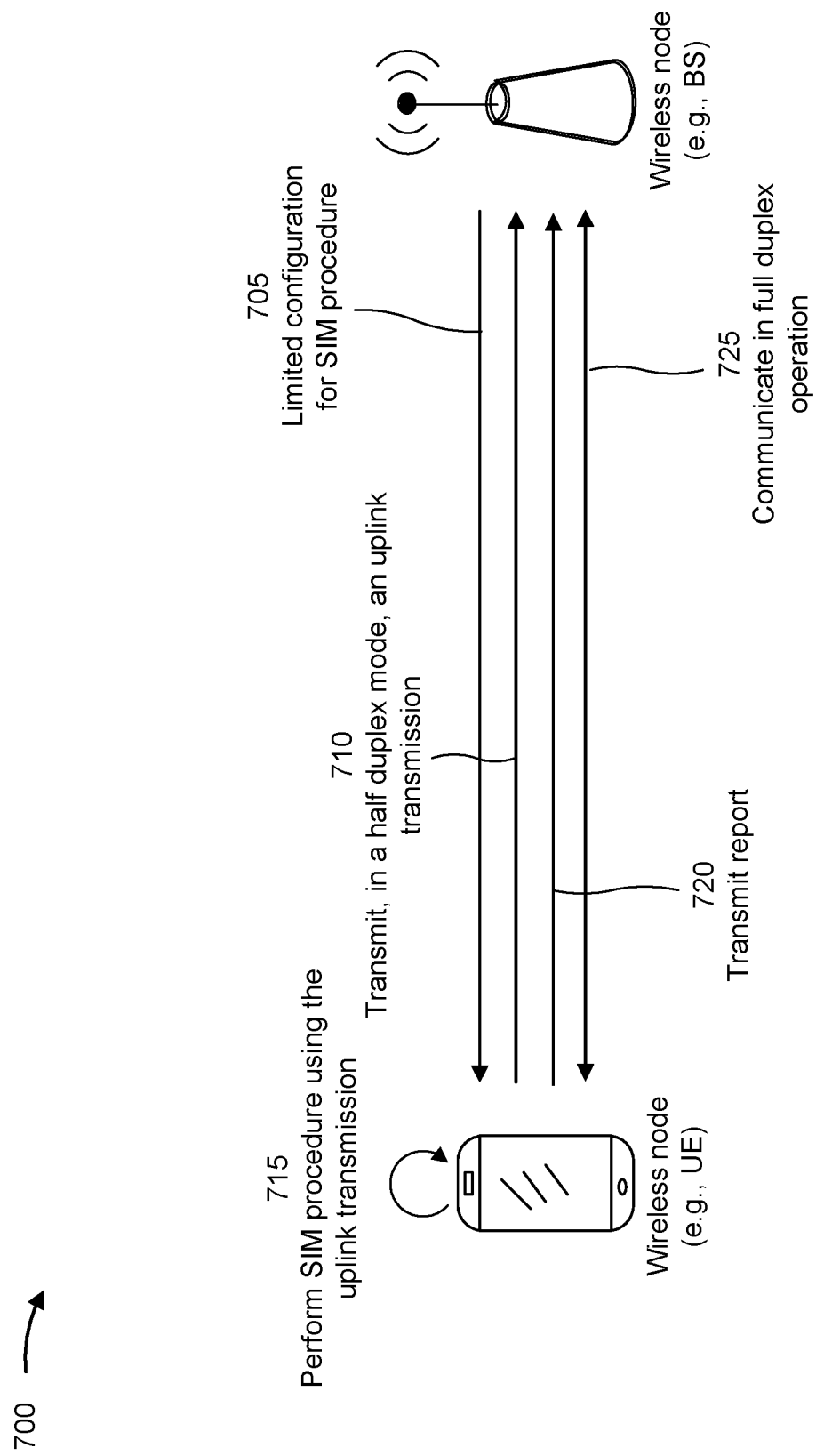
FIGS. 7A-7C are diagrams illustrating one or more examples associated with wireless node autonomous SIMs for full duplex operation, in accordance with the present disclosure.
Figure 7B:
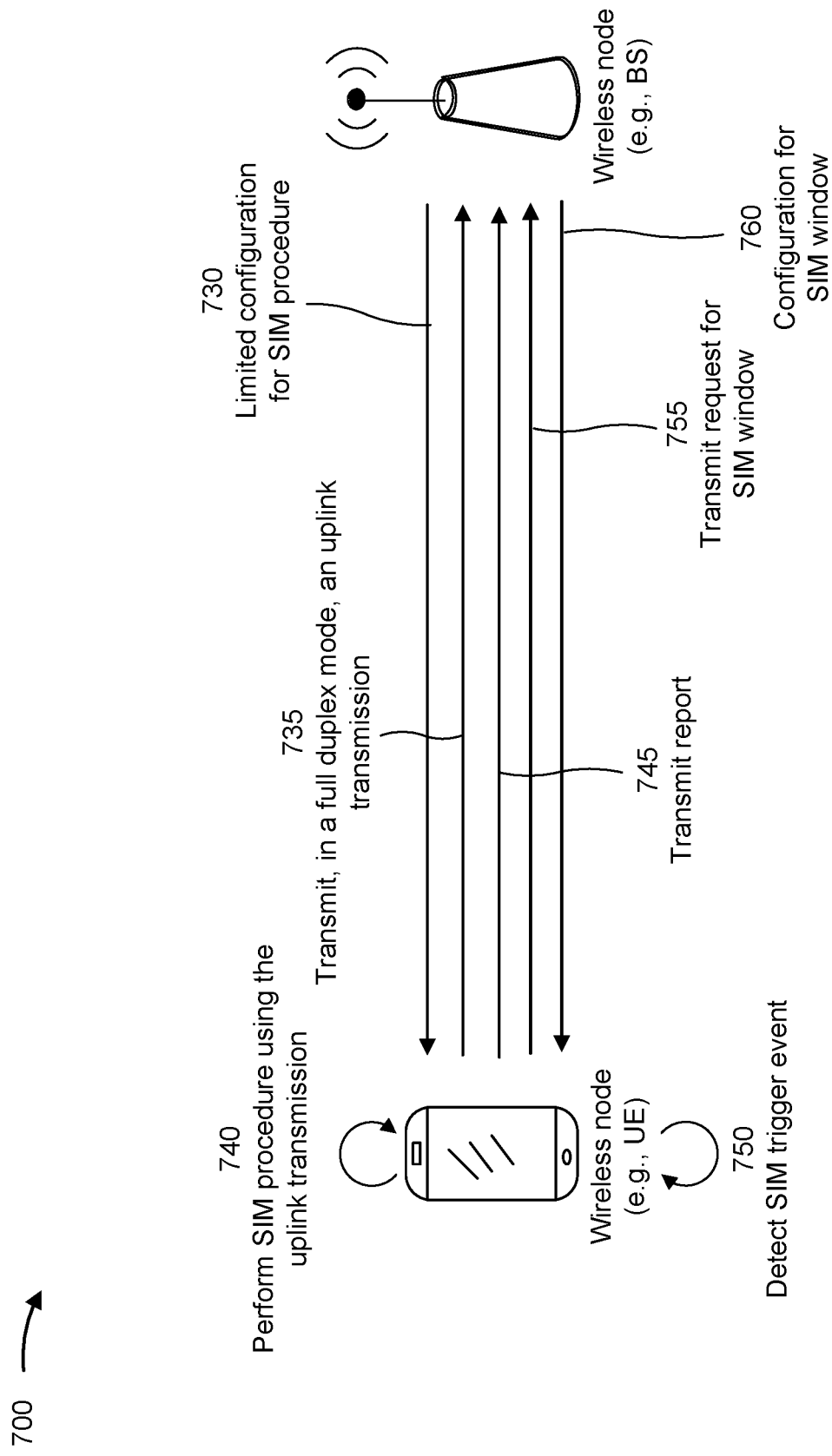
Figure 7C:
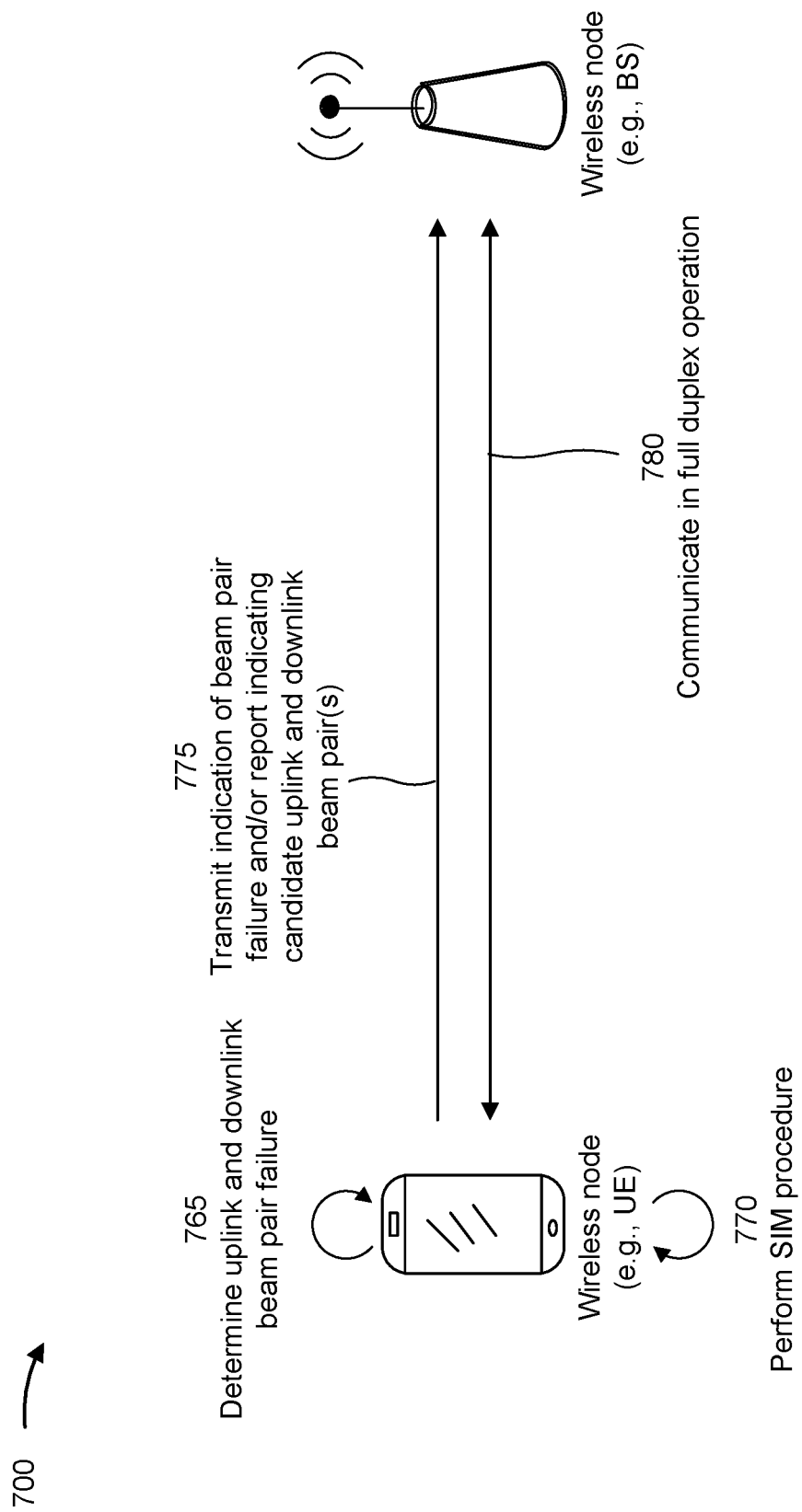

FIGS. 7A-7C is a diagram illustrating one or more example(s) 700 associated with wireless node assisted uplink beam management for full duplex transmissions, in accordance with the present disclosure. As shown in FIGS. 7A-7C, example(s) 700 include a first wireless node in communication with a second wireless node in a wireless network (e.g., wireless network 100, radio access network 305, radio access network 330, and/or radio access network 365). In some aspects, as shown in FIGS. 7A-7C, the first wireless node may be a UE (e.g., UE 120, and/or UE 502) and the second wireless node may be a base station (e.g., base station 110, and/or base station 504). Additionally, or alternatively, in some aspects, the first wireless node and the second wireless node may correspond to other suitable devices that can communicate on an uplink and a downlink (e.g., the first wireless node may correspond to an MT node, a child node, and/or a scheduled node, among other examples, and the second wireless node may correspond to a control node, a parent node, a scheduling node, and/or an IAB donor node, among other examples).

As shown in FIG. 7A, the first wireless node may be communicating with the second wireless node in a half duplex communication mode (e.g., prior to reporting a full duplex capability of the first wireless node to the second wireless node). As shown by reference number 705, the second wireless node may transmit, to the first wireless node, a limited configuration for a SIM procedure. In some aspects, the second wireless node may not transmit the limited configuration for the SIM procedure (e.g., the first wireless node may perform a SIM procedure without receiving a configuration from the second wireless node, such that the second wireless node may be unaware that the first wireless node is performing the SIM procedure, as explained below).

The limited configuration may configure a measurement window to perform the SIM, an allocation of resources to be used by the first wireless node for transmitting a measurement report indicating a result of the SIM, one or more periodic sounding reference signals (SRSs) to be used by the first wireless node as an uplink transmit beam when performing the SIM (e.g., for uplink transmit beam sweeping), among other examples. In some aspects, the first wireless node may transmit a request indicating a requested configuration for the SIM procedure. The second wireless node may determine the limited configuration for the SIM procedure based at least in part on the request indicating the requested configuration for the SIM procedure. In some aspects, the second wireless node may determine the limited configuration for the SIM procedure independently (e.g., without receiving a request or input from the first wireless node).

As shown by reference number 710, the first wireless node may transmit, in the half duplex communication mode, an uplink transmission to the second wireless node. The uplink transmission may be an SRS, an uplink DMRS of a physical uplink shared channel (PUSCH), an uplink DMRS of a physical uplink control channel (PUCCH), an uplink control transmission (e.g., a PUCCH transmission), and/or an uplink data transmission (e.g., a PUSCH transmission), among other examples. For example, the first wireless node may use a PUSCH transmission or a PUCCH transmission for a SIM in a similar manner as a reference signal (e.g., as the first wireless node may use the signal identifier of the PUSCH or the PUCCH to measure the SIM associated with an uplink transmit beam from one antenna panel and a downlink receive beam of another antenna panel).

The uplink transmission may be scheduled, triggered, and/or configured, among other examples, independently of a SIM procedure performed by the first wireless node (e.g., the uplink transmission may be previously scheduled, triggered, and/or configured, by the second wireless node). In some aspects, the uplink transmission may be configured in the limited configuration for the SIM procedure transmitted by the second wireless node. For example, the uplink transmission may be an SRS of the one or more periodic SRSs configured by the second wireless node.

As shown by reference number 715, the first wireless node may perform a SIM procedure using the uplink transmission. The SIM procedure may be a cross panel SIM that may include performing a SIM associated with an uplink transmit beam from one antenna panel of the first wireless node and a downlink receive beam from another antenna panel of the first wireless node. In some aspects, the first wireless node may perform the SIM based at least in part on based at least in part on determining that the uplink receive beam and the downlink transmit beam for the SIM are associated with different TRPs at the second wireless node. As an uplink and downlink beam pair for full duplex communication should be associated with different TRPs at both the first wireless node and the second wireless node, the first wireless node may take into account a TRP of different beams at the second wireless node when selecting the uplink receive beam and the downlink transmit beam for the SIM. For example, the downlink beam may be received from one TRP and the uplink beam may transmit to another TRP.

For example, in some aspects, the second wireless node may indicate TRP indices of the second wireless node associated with different beams. In some aspects, as described above in connection with FIG. 5A, the first wireless node may be in communication with TRPs (e.g., multiple second wireless nodes, and/or a second wireless node with multiple TRPs) that are not co-located. The second wireless nodes may indicate a TRP index associated with a beam in transmissions to the first wireless node (e.g., in synchronization signal block (SSB) transmissions and/or other transmissions). The first wireless node may determine the uplink transmit beam for the SIM based at least in part on the uplink transmit beam being associated with a first TRP (e.g., a first TRP index) of the second wireless node. The first wireless node may determine the downlink receive beam for the SIM based at least in part on the downlink receive beam being associated with a second TRP (e.g., a second TRP index) of the second wireless node.

In some aspects, as described above in connection with FIG. 5C, the first wireless node may be in communication with TRPs of the second wireless node that are co-located.

In that case, selecting the uplink transmit beam and the downlink receive beam as described above may result in performing a SIM associated with an unsuitable uplink and downlink candidate beam pair, as the uplink transmit beam and the downlink receive beam may be associated with a same antenna panel of the second wireless node (e.g., based at least in part on the TRPs of the second wireless node being co-located). Therefore, the first wireless node may receive, from the second wireless node, a downlink control information (DCI) communication indicating uplink transmissions associated with one or more TRP indices (or one or more antenna panel indices) of the second wireless node. That is, the second wireless node may indicate TRPs, antenna panels, and/or beam groups of the second wireless node associated with different TRPs, different antenna panels, and/or different beam groups of the second wireless node. The first wireless node may determine the uplink transmit beam for the SIM based at least in part on the uplink transmit beam being associated with a first TRP index (or a first antenna panel index, and/or a first beam group index, among other examples) of the second wireless node (e.g., indicated in the DCI communication). The first wireless node may determine the downlink receive beam for the SIM based at least in part on the downlink receive beam being associated with a second TRP index (or a second antenna panel index, and/or a second beam group index, among other examples) of the second wireless node (e.g., indicated in the DCI communication). In this way, the first wireless node may perform a SIM associated with candidate uplink and downlink beam pairs that are suitable for full duplex operation at both the first wireless node and the second wireless node. This may conserve resources associated with performing a SIM associated with candidate uplink and downlink beam pairs that may be suitable for full duplex operation at the first wireless node, but that may not be suitable for full duplex operation at the second wireless node.

In some aspects, the uplink transmission may be scheduled or configured to be transmitted over multiple symbols and/or over multiple slots (e.g., the uplink transmission may be transmitted on an uplink beam over multiple symbols and/or over multiple slots). The first wireless node may perform multiple SIMs associated with the uplink beam during the multiple symbols and/or during the multiple slots by performing a receive beam sweep while transmitting on the uplink beam. For example, the uplink transmission (e.g., a PUSCH transmission) may be scheduled to be transmitted on an uplink beam of a first antenna panel of the first wireless node for 6 symbols. In an example where a SIM configuration of the first wireless node indicates that a SIM requires 2 symbols to be performed (e.g., the uplink transmit beam must transmit for 2 symbols and the downlink receive beam must receive for 2 symbols to perform the SIM), the first wireless node may perform a first SIM associated with the uplink transmit beam of the first antenna panel and a first downlink receive beam of a second antenna panel for the first 2 symbols of the uplink transmission. The first wireless node may perform a second SIM associated with the uplink transmit beam of the first antenna panel and a second downlink receive beam of the second antenna panel (or another antenna panel that is not the first antenna panel) for the next 2 symbols of the uplink transmission. The first wireless node may perform a third SIM associated with the uplink transmit beam of the first antenna panel and a third downlink receive beam of the second antenna panel (or another antenna panel that is not the first antenna panel) for the last 2 symbols of the uplink transmission. In this way, the first wireless node may reduce latency associated with performing the SIM.

In some aspects, the uplink transmission may include an SRS of one or more periodic SRSs (e.g., that may be configured by the second wireless node in the limited configuration for the SIM procedure). The limited configuration for the SIM procedure may configure the SRS to be used as uplink transmit beams for the SIM procedure, but the limited configuration for the SIM procedure may not configure any downlink receive beams for the SIM procedure. The first wireless node may determine one or more downlink receive beams for the SIM associated with the SRS (or a repetition of the SRS). For example, transmitting the SRS of the one or more periodic SRSs may include performing a beam sweep through one or more uplink transmit beams associated with an antenna panel of the first wireless node. The first wireless node may, while transmitting on an uplink transmit beam of the one or more uplink transmit beams, perform a beam sweep through one or more downlink receive beams associated with a different antenna panel of the first wireless node to perform one or more SIMs associated with the uplink transmit beam and the one or more downlink receive beams. The first wireless node may perform a similar beam sweep through one or more downlink receive beams for each uplink transmit beam of the one or more uplink transmit beams associated with transmitting the SRS. In this way, the first wireless node may reduce latency associated with performing the SIM.

In some aspects, the first wireless node may perform the SIM procedure based at least in part on the limited configuration received from the second wireless node. For example, the first wireless node may perform the SIM during a SIM window configured by the second wireless node, may perform the SIM using one or more periodic SRSs configured by the second wireless node, and/or the like. The first wireless node may determine other aspects of the SIM procedure (e.g., a downlink receive beam to use for the SIM procedure, an uplink transmission to use for the SIM procedure, and/or a window in which to perform the SIM procedure, among other examples) that may not be included in the limited configuration for the SIM procedure received from the second wireless node. In some aspects, the first wireless node may perform the SIM procedure without receiving any configuration for the SIM procedure from the second wireless node. For example, the first wireless node may perform the SIM using an uplink transmission that was previously scheduled, configured, triggered, and/or the like independent of the SIM procedure.

As shown by reference number 720, the first wireless node may transmit a report (e.g., a measurement report) indicating one or more candidate uplink and downlink beam pair(s) suitable for full duplex communication. The report may indicate one or more results (e.g., one or more RSRP measurement values) of one or more SIMs performed by the first wireless node. In some aspects, the report may indicate a full duplex capability of the first wireless node (e.g., may indicate whether a full duplex communication mode of the first wireless node is to be enabled or disabled). In some aspects, the first wireless node may transmit, to the second wireless node, the full duplex capability of the first wireless node separately from the report.

As shown by reference number 725, the first wireless node and the second wireless node may communicate in full duplex operation based at least in part on the report indicating the one or more candidate uplink and downlink beam pair(s) suitable for full duplex communication and/or the indication of the full duplex capability of the first wireless node. The second wireless node may determine a selected uplink and downlink beam pair based at least in part on the report indicating the one or more candidate uplink and downlink beam pair(s) suitable for full duplex communication. The first wireless node and the second wireless node may communicate, in full duplex operation, using the selected uplink and downlink beam pair. In this way, the first wireless node may autonomously perform a SIM procedure, in a half duplex communication mode, to assist in determining one or more candidate uplink and downlink beam pair(s) suitable for full duplex communication.

As shown in FIG. 7B, the first wireless node and the second wireless node may be communicating in full duplex operation (e.g., the first wireless node and the second wireless node may both be in a full duplex communication mode). As described herein, the first wireless node may continue to autonomously perform SIMs while operating in the full duplex communication mode.

As shown by reference number 730, the second wireless node may transmit a limited configuration for a SIM procedure while in the full duplex communication mode. Due to the nature of full duplex operation, the wireless node may be transmitting and receiving communications at the same time. As a result, the first wireless node may require a period of time to perform a SIM (e.g., a SIM window) in which no downlink communications (e.g., no downlink data communications, no downlink control communications, and/or no full duplex communications) from the second wireless node are scheduled.

The limited configuration for the SIM procedure may configure one or more half duplex slots in a full duplex communication mode (e.g., slots during which no full duplex communications are to be scheduled). The half duplex slots may be configured based at least in part on a repetition scheme (e.g., the half duplex slots may be configured periodically). In some aspects, the half duplex slots may be configured to be non-periodic. The half duplex slots may be configured such that the first wireless node may perform a SIM during a half duplex slot using an uplink communication (e.g., in a similar manner as described above in connection with FIG. 7A). In some aspects, the second wireless node may refrain from scheduling any downlink communications from the second wireless node to the first wireless node during the one or more half duplex slots.

As shown by reference number 735, the first wireless node, in a full duplex communication mode, may transmit an uplink transmission to the second wireless node. The uplink transmission may occur during a half duplex slot configured by the second wireless node. The uplink transmission may be an SRS, an uplink DMRS of a PUSCH, an uplink DMRS of a PUCCH, an uplink control transmission (e.g., a PUCCH transmission), and/or an uplink data transmission (e.g., a PUSCH transmission), among other examples. As described above in connection with FIG. 7A, the uplink transmission may be scheduled independent of a SIM procedure or may be configured by the limited configuration for the SIM procedure (e.g., may be an SRS of one or more configured periodic SRSs).

As shown by reference number 740, the first wireless node may perform a SIM procedure using the uplink transmission. The first wireless node may perform the SIM procedure during a half duplex slot configured by the second wireless node. In some aspects, the first wireless node may perform the SIM in a similar manner as described above in connection with reference number 715 of FIG. 7A. In some aspects, the first wireless node may perform a SIM associated with an ongoing active (e.g., a currently selected) uplink and downlink beam pair to determine if the active uplink and downlink beam pair is still suitable for full duplex communications. For example, the first wireless node may perform a SIM associated with the active uplink and downlink beam pair to determine if the SIM satisfies a threshold self-interference value (e.g., a threshold RSRP value).

In some aspects, if the first wireless node determines that the active uplink and downlink beam pair does satisfy the threshold self-interference value, the first wireless node may perform no further actions associated with the SIM and may continue to communicate, in a full duplex communication mode, with the second wireless node using the active uplink and downlink beam pair. In some aspects, if the first wireless node determines that the active uplink and downlink beam pair does not satisfy the threshold self-interference value, the first wireless node may perform a full or partial SIM procedure (e.g., as described above in connection with reference number 715 of FIG. 7A) to identify one or more candidate uplink and downlink beam pair(s) to replace the active uplink and downlink beam pair that does not satisfy the threshold self-interference value.

As shown by reference number 745, the first wireless node may transmit a report indicating one or more candidate uplink and downlink beam pair(s) in a similar manner as described above in connection with reference number 720 of FIG. 7A. In some aspects, the first wireless node, in full duplex communication mode, may transmit the report indicating one or more candidate uplink and downlink beam pair(s) based at least in part on determining that the active uplink and downlink beam pair does not satisfy the threshold self-interference value. In this way, the first wireless node may autonomously perform a SIM procedure, in a full duplex communication mode, to assist in evaluating an active uplink and downlink beam pair for full duplex communication and/or to assist in determining one or more candidate uplink and downlink beam pair(s) suitable for full duplex communication.

As shown by reference number 750, the first wireless node may detect a SIM trigger event. The SIM trigger event may be determining that a downlink signal-to-interference-plus-noise ratio (SINR) value of a downlink signal received from the second wireless node does not satisfy a threshold SINR value, detecting a downgrade in an SINR value of a downlink signal received from the second wireless node, and/or the like. As shown by reference number 755, the first wireless node may transmit a request for a SIM window to the second wireless node based at least in part on detecting the SIM trigger event.

As shown by reference number 760, the second wireless node may configure a SIM window for the first wireless node to perform a SIM procedure based at least in part on receiving the request for a SIM window from the first wireless node. For example, the second wireless node may configure one or more half duplex slots for the first wireless node to perform a SIM procedure, as described above. In some aspects, the second wireless node may configure a period of time during which no full duplex communications are scheduled and/or during which no downlink communications are scheduled based at least in part on receiving the request for a SIM window from the first wireless node.

The first wireless node may perform a SIM procedure (e.g., in a similar manner as described above in connection with reference number 715 of FIG. 7A) during the configured SIM window to identify one or more candidate uplink and downlink beam pair(s) based at least in part on detecting the SIM trigger event. The first wireless node may transmit a report, to the second wireless node, indicating the one or more candidate uplink and downlink beam pair(s) and/or one or more SIM results associated with the candidate uplink and downlink beam pair(s) (e.g., in a similar manner as described above in connection with reference number 720 of FIG. 7A). In this way, the first wireless node may dynamically perform a SIM during full duplex operation based at least in part on detecting a change in an operating condition of a downlink signal from the second wireless node.

As shown in FIG. 7C, and by reference number 765, the first wireless node, while communicating with the second wireless node in a full duplex communication mode, may determine or detect an uplink and downlink beam pair failure (e.g., may determine that the active uplink and downlink beam pair for full duplex communications has failed and/or needs to be changed). In some aspects, the first wireless node may determine that the active uplink and downlink beam pair has completely failed (e.g., the first wireless node is no longer able to communicate using the active uplink and downlink beam pair). In some aspects, the first wireless node may determine that a measurement value (e.g., an SINR value, an RSSI and/or a CQI) of the active uplink and downlink beam pair (e.g., of a downlink signal transmitted using the active uplink and downlink beam pair) does not satisfy a threshold value. The first wireless node may determine an uplink and downlink beam pair failure based at least in part on determining that the measurement value of the active uplink and downlink beam pair does not satisfy the threshold value.

As shown by reference number 770, the first wireless node may perform a SIM procedure (e.g., (e.g., in a similar manner as described above in connection with reference number 715 of FIG. 7A and/or reference number 740 of FIG. 7B) based at least in part on determining the uplink and downlink beam pair failure. In some aspects, the first wireless node may perform the SIM procedure without informing the second wireless node. In some aspects, the first wireless node may perform the SIM procedure during a half duplex slot configured by the second wireless node. In some aspects, the first wireless node may request a SIM window based at least in part on determining the uplink and downlink beam pair failure. The first wireless node may perform the SIM during a SIM window configured by the second wireless node.

As shown by reference number 775, the first wireless node may transmit, to the second wireless node, an indication of the uplink and downlink beam pair failure. The indication of the uplink and downlink beam pair failure may include the measurement value of the active uplink and downlink beam pair failure. Additionally, or alternatively, the first wireless node may transmit, to the second wireless node, a report indicating one or more candidate uplink and downlink beam pair(s) suitable for full duplex operation (e.g., based at least in part on performing the SIM procedure after determining the uplink and downlink beam pair failure). For example, the report may indicate one or more SIM results of one or more SIMs performed by the first wireless node based at least in part on determining the uplink and downlink beam pair failure.

In some aspects, the first wireless node may determine a resource allocation, in a PUSCH, for a medium access control (MAC) control element (MAC-CE) (e.g., a special MAC structure to carry uplink control information in a PUSCH). The first wireless node may transmit the indication of the uplink and downlink beam pair failure and/or the report indicating one or more candidate uplink and downlink beam pair(s) suitable for full duplex operation using the MAC-CE in PUSCH.

In some aspects, the first wireless node may determine that there are no PUSCH resources available for transmitting the indication of the uplink and downlink beam pair failure and/or the report indicating one or more candidate uplink and downlink beam pair(s) suitable for full duplex operation. In that case, the first wireless node may transmit a scheduling request to the second wireless node requesting a resource allocation for transmitting the indication of the uplink and downlink beam pair failure and/or the report indicating one or more candidate uplink and downlink beam pair(s) suitable for full duplex operation. The second wireless node may transmit, to the first wireless node, a scheduling grant, granting uplink resources (e.g., PUSCH resources, PUCCH resources, and/or the like) to the first wireless node, based at least in part on receiving the scheduling request from the first wireless node. The first wireless node may transmit the indication of the uplink and downlink beam pair failure and/or the report indicating one or more candidate uplink and downlink beam pair(s) suitable for full duplex operation using the uplink resources allocated by the scheduling grant.

As shown by reference number 780, the first wireless node and the second wireless node may communicate in full duplex operation based at least in part on the indication of the uplink and downlink beam pair failure and/or the report indicating one or more candidate uplink and downlink beam pair(s) suitable for full duplex operation. For example, the second wireless node may receive the indication of the uplink and downlink beam pair failure and may determine a new selected (e.g., active) uplink and downlink beam pair from the one or more candidate uplink and downlink beam pair(s) (e.g., based at least in part on a SIM result indicated in the report and/or the like). In this way, the first wireless node may determine an uplink and downlink beam pair failure and may autonomously perform a SIM to identify one or more candidate uplink and downlink beam pair(s) to replace the failed uplink and downlink beam pair. This may reduce latency and signaling overhead associated with determining an uplink and downlink beam pair for full duplex communications after an uplink and downlink beam pair failure.

As described herein, the first wireless node may autonomously perform a SIM procedure to assist in determining uplink and downlink beam pairs that may support full duplex communication during both a half duplex communication mode and a full duplex communication mode. As a result, latency and signaling overhead associated with performing the SIM procedure and determining the uplink and downlink beam pairs that may support full duplex communication may be reduced.

As indicated above, FIGS. 7A-7C are provided as one or more example(s). Other examples may differ from what is described with respect to FIGS. 7A-7C.

Figure 8:
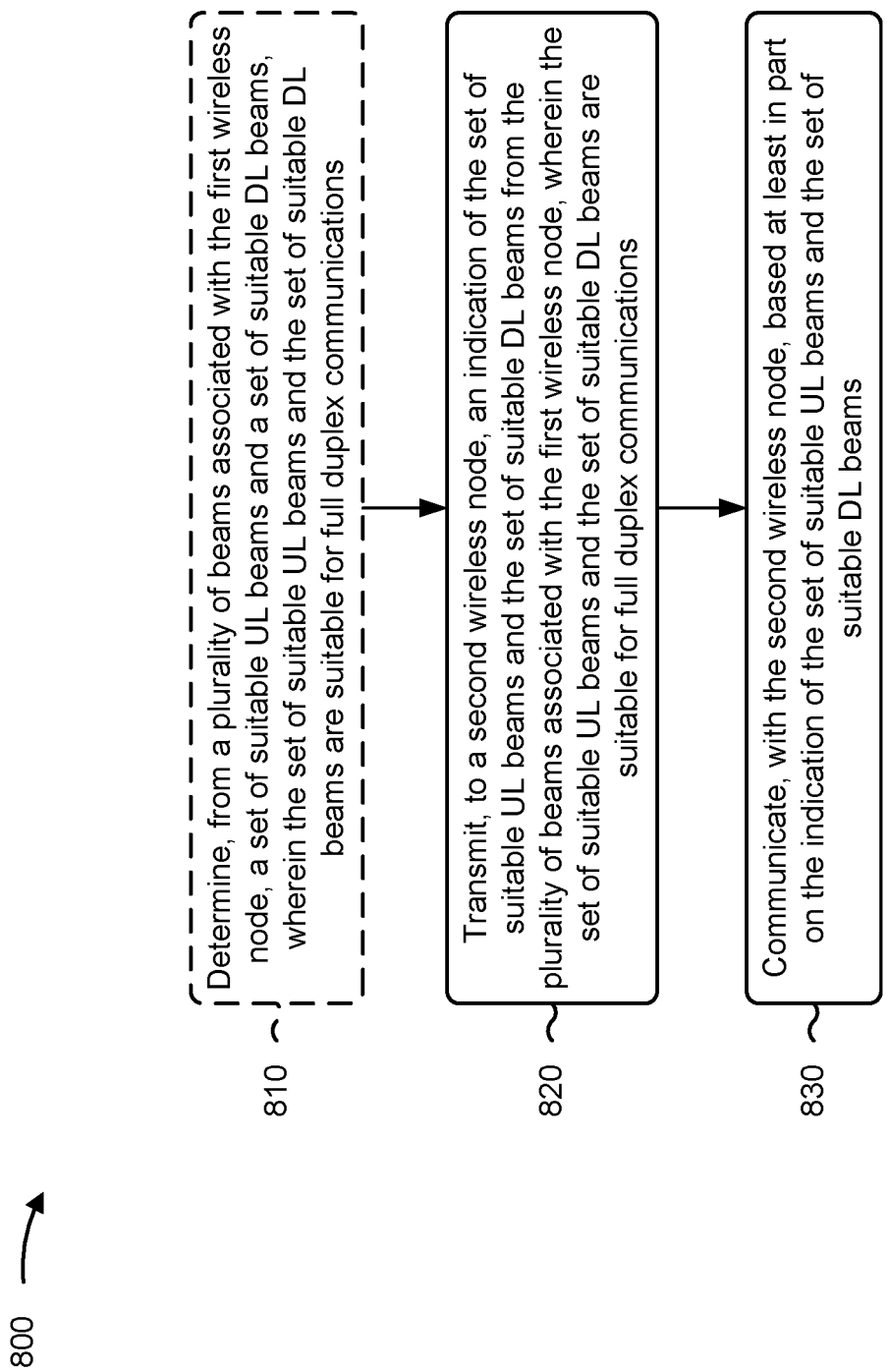

FIG. 8 is a diagram illustrating an example process 800 performed, for example, by a first wireless node, in accordance with the present disclosure. Example process 800 is an example where the first wireless node (e.g., a UE 120, and/or an IAB node 410, among other examples) performs operations associated with wireless node SIMs and uplink beam management for full duplex transmissions.

As shown in FIG. 8, in some aspects, process 700 may optionally include determining, from a plurality of beams associated with the first wireless node, a set of suitable UL beams and a set of suitable DL beams, wherein the set of suitable UL beams and the set of suitable DL beams are suitable for full duplex communications (block 810). For example, the first wireless node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may determine, from a plurality of beams associated with the first wireless node, a set of suitable UL beams and a set of suitable DL beams, as described above. In some aspects, the set of suitable UL beams and the set of suitable DL beams are suitable for full duplex communications.

As further shown in FIG. 8, in some aspects, process 800 may include transmitting, to a second wireless node, an indication of the set of suitable UL beams and the set of suitable DL beams from the plurality of beams associated with the first wireless node, wherein the set of suitable UL beams and the set of suitable DL beams are suitable for full duplex communications (block 820). For example, the first wireless node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may transmit, to a second wireless node, an indication of the set of suitable UL beams and the set of suitable DL beams from the plurality of beams associated with the first wireless node, wherein the set of suitable UL beams and the set of suitable DL beams are suitable for full duplex communications, as described above.

As further shown in FIG. 8, process 800 may include communicating (e.g., transmitting and/or receiving), with the second wireless node, based at least in part on the indication of the set of suitable UL beams and the set of suitable DL beams (block 830). For example, the first wireless node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may communicate, with the second wireless node, based at least in part on the indication of the set of suitable UL beams and the set of suitable DL beams, as described above.

Process 800 may include additional aspects, such as any single aspect or any combination of aspects described below and/or in connection with one or more other processes described elsewhere herein.

In a first aspect, the first wireless node is a user equipment, a mobile terminal, or a child node.

In a second aspect, alone or in combination with the first aspect, the second wireless node is a base station, a parent node, or a control node.

In a third aspect, alone or in combination with one or more of the first and second aspects, process 800 includes performing SIM associated with an UL Tx beam, from the set of suitable UL beams, from one panel of the first wireless node and a DL Rx beam, from the set of suitable DL beams, from another panel of the first wireless node; and transmitting a measurement report indicating the SIM.

In a fourth aspect, alone or in combination with one or more of the first through third aspects, performing the SIM comprises determining one or more UL beams, from the set of suitable UL beams, to be used as Tx beams for the SIM, and determining one or more DL beams, from the set of suitable DL beams, to be used as Rx beams for the SIM.

In a fifth aspect, alone or in combination with one or more of the first through fourth aspects, determining the set of suitable UL beams and the set of suitable DL beams comprises determining that a beam is suitable for at least one of UL transmission or DL reception based at least in part on at least one of an MPE limit associated with the beam, a panel of the first wireless node associated with the beam, a full duplex Tx/Rx capability of the first wireless node, a channel associated with the DL and the UL beam pair, a transmit power associated with the beam, or a combination thereof.

In a sixth aspect, alone or in combination with one or more of the first through fifth aspects, transmitting the indication comprises transmitting the indication using radio resource control signaling.

In a seventh aspect, alone or in combination with one or more of the first through sixth aspects, transmitting the indication comprises dynamically transmitting the indication using UL control signaling.

In an eighth aspect, alone or in combination with one or more of the first through seventh aspects, the first wireless node is operating in a half duplex communication mode.

In a ninth aspect, alone or in combination with one or more of the first through eighth aspects, the first wireless node is operating in a full duplex communication mode.

In a tenth aspect, alone or in combination with one or more of the first through ninth aspects, the set of suitable UL beams is a first set of suitable UL beams and the set of suitable DL beams is a first set of suitable DL beams, and process 800 includes determining, from the plurality of beams associated with the first wireless node, a second set of suitable UL beams and a second set of suitable DL beams, and transmitting, to the second wireless node, an indication of the second set of suitable UL beams and the second set of suitable DL beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
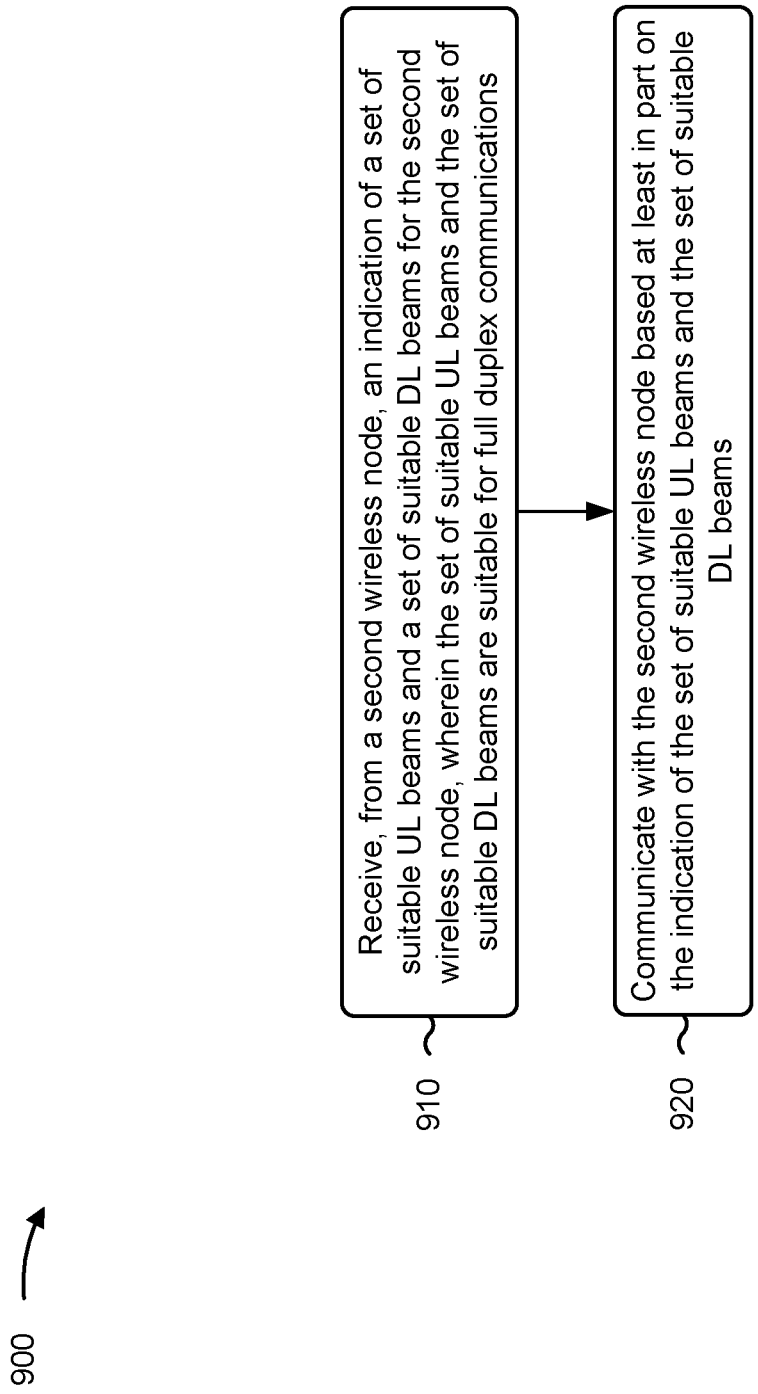

FIG. 9 is a diagram illustrating an example process 900 performed, for example, by a first wireless node, in accordance with the present disclosure. Example process 900 is an example where the first wireless node (e.g., a base station 110, and/or an IAB donor 405, among other examples) performs operations associated with wireless node SIMs and uplink beam management for full duplex transmissions.

As shown in FIG. 9, in some aspects, process 900 may include receiving, from a second wireless node, an indication of a set of suitable UL beams and a set of suitable DL beams for the second wireless node, wherein the set of suitable UL beams and the set of suitable DL beams are suitable for full duplex communications (block 910). For example, the first wireless node (e.g., using antenna 234, DEMOD 232, MIMO detector 236, receive processor 238, controller/processor 240, memory 242, communication unit 294, controller/processor 290, memory 292, and/or the like) may receive, from a second wireless node, an indication of a set of suitable UL beams and a set of suitable DL beams for the second wireless node, as described above. In some aspects, the set of suitable UL beams and the set of suitable DL beams are suitable for full duplex communications.

As further shown in FIG. 9, in some aspects, process 900 may include communicating with the second wireless node based at least in part on the indication of the set of suitable UL beams and the set of suitable DL beams (block 920). For example, the first wireless node (e.g., using antenna 234, DEMOD 232, MIMO detector 236, receive processor 238, controller/processor 240, memory 242, communication unit 294, controller/processor 290, memory 292, and/or the like) may communicate with the second wireless node based at least in part on the indication of the set of suitable UL beams and the set of suitable DL beams, as described above.

Process 900 may include additional aspects, such as any single aspect or any combination of aspects described below and/or in connection with one or more other processes described elsewhere herein.

In a first aspect, the first wireless node is a base station, a parent node, or a control node.

In a second aspect, alone or in combination with the first aspect, the second wireless node is a user equipment, a mobile terminal, or a child node.

In a third aspect, alone or in combination with one or more of the first and second aspects, communicating with the second wireless node comprises receiving, from the second wireless node, a measurement report indicating a SIM associated with an UL Tx beam, from the set of suitable UL beams, from one panel of the second wireless node and a DL Rx beam, from the set of suitable DL beams, from another panel of the second wireless node, and determining a selected beam pair based at least in part on the measurement report.

In a fourth aspect, alone or in combination with one or more of the first through third aspects, the indication of the set of suitable UL beams and the set of suitable DL beams for the second wireless node is based at least in part on at least one of an MPE limit associated with the beam, a panel of the second wireless node associated with the beam, a full duplex Tx/Rx capability of the second wireless node, a channel associated with the DL and the UL beam pair, a transmit power associated with the beam, or a combination thereof.

In a fifth aspect, alone or in combination with one or more of the first through fourth aspects, receiving the indication comprises receiving the indication using radio resource control signaling.

In a sixth aspect, alone or in combination with one or more of the first through fifth aspects, receiving the indication comprises dynamically receiving the indication using UL control signaling.

In a seventh aspect, alone or in combination with one or more of the first through sixth aspects, the second wireless node is operating in a half duplex communication mode.

In an eighth aspect, alone or in combination with one or more of the first through seventh aspects, the second wireless node is operating in a full duplex communication mode.

In a ninth aspect, alone or in combination with one or more of the first through eighth aspects, the set of suitable UL beams is a first set of suitable UL beams and the set of suitable DL beams is a first set of suitable DL beams, and process 900 includes receiving, from the second wireless node, an indication of a second set of suitable UL beams and a second set of suitable downlink DL beams for the second wireless node, and communicating with the second wireless node based at least in part on the indication of the second set of suitable UL beams and the second set of suitable downlink DL beams.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
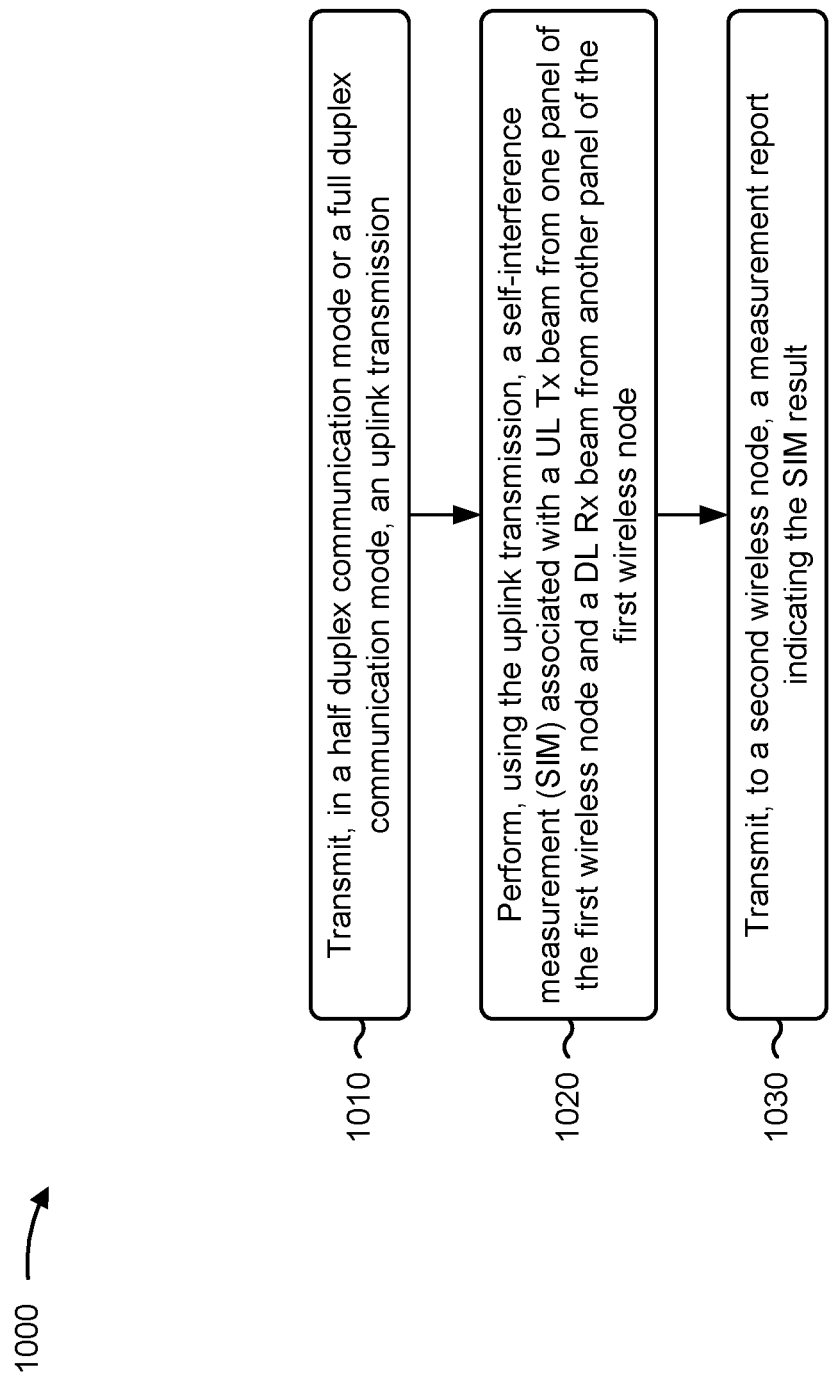

FIG. 10 is a diagram illustrating an example process 1000 performed, for example, by a first wireless node, in accordance with the present disclosure. Example process 1000 is an example where the first wireless node (e.g., a UE 120, and/or an IAB node 410, among other examples) performs operations associated with wireless node SIMs and uplink beam management for full duplex transmissions.

As shown in FIG. 10, in some aspects, process 1000 may include transmitting, in a half duplex communication mode or a full duplex communication mode, an uplink transmission (block 1010). For example, the first wireless node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may transmit, in a half duplex communication mode or a full duplex communication mode, an uplink transmission, as described above.

As further shown in FIG. 10, in some aspects, process 1000 may include performing, using the uplink transmission, a SIM associated with a UL Tx beam from one panel of the first wireless node and a DL Rx beam from another panel of the first wireless node (block 1020). For example, the first wireless node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may perform, using the uplink transmission, a SIM associated with a UL Tx beam from one panel of the first wireless node and a DL Rx beam from another panel of the first wireless node, as described above.

As further shown in FIG. 10, in some aspects, process 1000 may include transmitting, to a second wireless node, a measurement report indicating a result of the SIM (block 1030). For example, the first wireless node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may transmit, to a second wireless node, a measurement report indicating a result of the SIM, as described above.

Process 1000 may include additional aspects, such as any single aspect or any combination of aspects described below and/or in connection with one or more other processes described elsewhere herein.

In a first aspect, the first wireless node is a user equipment, a mobile terminal, or a child node.

In a second aspect, alone or in combination with the first aspect, the second wireless node is a base station, a parent node, or a control node.

In a third aspect, alone or in combination with one or more of the first and second aspects, process 1000 includes determining the UL Tx beam based at least in part on the UL Tx beam being associated with a first transmit receive point (TRP) of the second wireless node; and determining the DL Rx beam based at least in part on the DL Rx beam being associated with a second TRP of the second wireless node.

In a fourth aspect, alone or in combination with one or more of the first through third aspects, process 1000 includes receiving, from the second wireless node, a downlink control information communication indicating UL transmissions associated with one or more TRP indices associated with the second wireless node, wherein performing the SIM comprises determining the UL Tx beam based at least in part on the UL Tx beam being associated with a first TRP index of the second wireless node; and determining the DL Rx beam based at least in part on the DL Rx beam being associated with a second TRP index of the second wireless node.

In a fifth aspect, alone or in combination with one or more of the first through fourth aspects, the uplink transmission is at least one of a sounding reference signal, a UL demodulation reference signal of a PUSCH, a UL demodulation reference signal of a PUCCH, a UL control transmission, or a UL data transmission.

In a sixth aspect, alone or in combination with one or more of the first through fifth aspects, a communication mode of the first wireless node is the half duplex communication mode, and transmitting the measurement report includes transmitting an indication of a full duplex capability of the first wireless node.

In a seventh aspect, alone or in combination with one or more of the first through sixth aspects, a communication mode of the first wireless node is the half duplex communication mode; transmitting the uplink transmission comprises transmitting the uplink transmission for a quantity of symbols, and performing the SIM comprises performing, for a first subset of symbols of the quantity of symbols, a first SIM associated with the UL Tx beam from a first panel of the first wireless node and a first DL Rx beam from a second panel of the first wireless node; and performing, for a second subset of symbols of the quantity of symbols, a second SIM associated with the UL Tx beam from the first panel of the first wireless node and a second DL Rx beam from the second panel of the first wireless node.

In an eighth aspect, alone or in combination with one or more of the first through seventh aspects, the uplink transmission is a PUSCH transmission.

In a ninth aspect, alone or in combination with one or more of the first through eighth aspects, process 1000 includes receiving, from the second wireless node, a configuration for a SIM procedure, wherein performing the SIM and transmitting the measurement report is based at least in part on the configuration for the SIM procedure.

In a tenth aspect, alone or in combination with one or more of the first through ninth aspects, a communication mode of the first wireless node is the half duplex communication mode, and the configuration for the SIM procedure configures at least one of a measurement window to perform the SIM, an allocation of resources to be used by the first wireless node for transmitting the measurement report, or one or more periodic SRSs.

In an eleventh aspect, alone or in combination with one or more of the first through tenth aspects, the configuration for the SIM procedure configures the one or more periodic SRSs, and process 1000 includes transmitting an SRS of the one or more periodic SRSs, using a beam sweep through one or more UL Tx beams from a first panel of the first wireless node, and performing the SIM comprises performing, while transmitting the SRS on a UL Tx beam of the one or more UL Tx beams, a beam sweep through one or more DL Rx beams from a second panel of the first wireless node to perform one or more SIMs associated with the UL Tx beam of the one or more UL Tx beams and the one or more DL Rx beams.

In a twelfth aspect, alone or in combination with one or more of the first through eleventh aspects, a communication mode of the first wireless node is the half duplex communication mode, and process 1000 includes transmitting, to the second wireless node, a request indicating a requested configuration for the SIM procedure, wherein receiving the configuration for the SIM procedure is based at least in part on transmitting the request indicating the requested configuration for the SIM procedure.

In a thirteenth aspect, alone or in combination with one or more of the first through twelfth aspects, a communication mode of the first wireless node is the half duplex communication mode, and the configuration for the SIM procedure is based at least in part on a determination by the second wireless node of the configuration for the SIM procedure.

In a fourteenth aspect, alone or in combination with one or more of the first through thirteenth aspects, a communication mode of the first wireless node is the full duplex communication mode, the configuration for the SIM procedure configures one or more half duplex slots, and the second wireless node refrains from scheduling DL data transmissions during the one or more half duplex slots In a fifteenth aspect, alone or in combination with one or more of the first through fourteenth aspects, performing the SIM comprises performing the SIM during a half duplex slot of the one or more half duplex slots, and determining whether an active DL and UL beam pair satisfies a threshold self-interference value.

In a sixteenth aspect, alone or in combination with one or more of the first through fifteenth aspects, one or more half duplex slots are configured based at least in part on a repetition scheme.

In a seventeenth aspect, alone or in combination with one or more of the first through sixteenth aspects, a communication mode of the first wireless node is the full duplex communication mode, and process 1000 includes detecting a SIM trigger event, and transmitting, to the second wireless node, a request for a SIM window, wherein receiving the configuration for the SIM procedure is based at least in part on transmitting the request for the SIM window.

In an eighteenth aspect, alone or in combination with one or more of the first through seventeenth aspects, detecting the SIM trigger event comprises determining that a DL SINR value of a DL signal from the second wireless node does not satisfy a threshold SINR value.

In a nineteenth aspect, alone or in combination with one or more of the first through eighteenth aspects, process 1000 includes performing another SIM, based at least in part on the configuration for the SIM procedure, associated with another UL Tx beam from one panel of the first wireless node and another DL Rx beam from another panel of the first wireless node; and transmitting, to the second wireless node, a measurement report indicating a result of the other SIM.

In a twentieth aspect, alone or in combination with one or more of the first through nineteenth aspects, a communication mode of the first wireless node is the full duplex communication mode, and process 1000 includes determining a UL and DL beam pair failure based at least in part on a measurement of the UL and DL beam pair; determining another candidate UL and DL beam pair based at least in part on performing a SIM associated with the other candidate UL and DL beam pair, and transmitting, to the second wireless node, an indication of the UL and DL beam pair failure and an indication of the other candidate UL and DL beam pair.

In a twenty-first aspect, alone or in combination with one or more of the first through twentieth aspects, determining the UL and DL beam pair failure comprises determining that the measurement of the UL and DL beam pair does not satisfy a threshold value.

In a twenty-second aspect, alone or in combination with one or more of the first through twenty-first aspects, the indication of the UL and DL beam pair failure indicates the measurement of the UL and DL beam pair, and the indication of the other candidate UL and DL beam pair includes a measurement report indicating a result of the SIM associated with the other candidate UL and DL beam pair.

In a twenty-third aspect, alone or in combination with one or more of the first through twenty-second aspects, transmitting the indication of the UL and DL beam pair failure and the indication of the other candidate UL and DL beam pair comprises determining a resource allocation, in a PUSCH, for a MAC-CE, and transmitting the indication of the UL and DL beam pair failure and the indication of the other candidate UL and DL beam pair using the MAC-CE.

In a twenty-fourth aspect, alone or in combination with one or more of the first through twenty-third aspects, transmitting the indication of the UL and DL beam pair failure and the indication of the other candidate UL and DL beam pair comprises determining that there are no PUSCH resources available for transmitting the indication of the UL and DL beam pair failure and the indication of the other candidate UL and DL beam pair; transmitting, to the second wireless node, a scheduling request for an allocation of UL resources; receiving, from the second wireless node, a scheduling grant allocating UL resources, and transmitting, using the allocated UL resources, the indication of the UL and DL beam pair failure and the indication of the other candidate UL and DL beam pair.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a first wireless node, in accordance with the present disclosure. Example process 1100 is an example where the first wireless node (e.g., a base station 110, and/or an IAB donor 405, among other examples) performs operations associated with wireless node SIMs and uplink beam management for full duplex transmissions.

As shown in FIG. 11, in some aspects, process 1100 may include receiving, from a second wireless node in a half duplex communication mode or a full duplex communication mode, an uplink transmission (block 1110). For example, the first wireless node (e.g., using antenna 234, DEMOD 232, MIMO detector 236, receive processor 238, controller/processor 240, memory 242, communication unit 294, controller/processor 290, memory 292, and/or the like) may receive, from a second wireless node in a half duplex communication mode or a full duplex communication mode, an uplink transmission, as described above.

As further shown in FIG. 11, in some aspects, process 1100 may include receiving, from the second wireless node, measurement report indicating a SIM result associated with a UL Tx beam from one panel of the second wireless node and a DL Rx beam from another panel of the second wireless node (block 1120). For example, the first wireless node (e.g., using antenna 234, DEMOD 232, MIMO detector 236, receive processor 238, controller/processor 240, memory 242, communication unit 294, controller/processor 290, memory 292, and/or the like) may receive, from the second wireless node, measurement report indicating a SIM result associated with a UL Tx beam from one panel of the second wireless node and a DL Rx beam from another panel of the second wireless node, as described above.

As further shown in FIG. 11, in some aspects, process 1100 may optionally include determining a selected UL and DL beam pair based at least in part on the measurement report (block 1130). For example, the first wireless node (e.g., using antenna 234, DEMOD 232, MIMO detector 236, receive processor 238, controller/processor 240, memory 242, communication unit 294, controller/processor 290, memory 292, and/or the like) may determine a selected UL and DL beam pair based at least in part on the measurement report, as described above.

As further shown in FIG. 11, in some aspects, process 1100 may include communicating, with the second wireless node, using the selected UL and DL beam pair based at least in part on the measurement report (block 1140). For example, the first wireless node (e.g., using antenna 234, DEMOD 232, MOD 232, MIMO detector 236, transmit processor 220, TX MIMO processor 230, receive processor 238, controller/processor 240, communication unit 294, and/or memory 242) may communicate, with the second wireless node, using the selected UL and DL beam pair based at least in part on the measurement report, as described above.

Process 1100 may include additional aspects, such as any single aspect or any combination of aspects described below and/or in connection with one or more other processes described elsewhere herein.

In a first aspect, the first wireless node is a base station, a parent node, or a control node.

In a second aspect, alone or in combination with the first aspect, the second wireless node is a user equipment, a mobile terminal, or a child node.

In a third aspect, alone or in combination with one or more of the first and second aspects, the UL Tx beam is associated with a first TRP of the first wireless node the DL Rx beam is associated with a second TRP of the first wireless node.

In a fourth aspect, alone or in combination with one or more of the first through third aspects, process 1100 includes transmitting, to the second wireless node, a downlink control information communication indicating uplink transmissions associated with one or more TRP indices associated with the first wireless node, wherein the UL Tx beam is associated with a first TRP index of the first wireless node the DL Rx beam is associated with a second TRP index of the first wireless node.

In a fifth aspect, alone or in combination with one or more of the first through fourth aspects, the SIM is performed by the second wireless node using the uplink transmission and the uplink transmission is at least one of a UL demodulation reference signal of a PUSCH, a UL demodulation reference signal of a PUCCH, a UL control transmission, or a UL data transmission.

In a sixth aspect, alone or in combination with one or more of the first through fifth aspects, a communication mode of the second wireless node is the half duplex communication mode, and receiving the measurement report comprises receiving an indication of a full duplex capability of the first wireless node.

In a seventh aspect, alone or in combination with one or more of the first through sixth aspects, a communication mode of the second wireless node is the half duplex communication mode, receiving the uplink transmission comprises receiving the uplink transmission for a quantity of symbols, and receiving the measurement report indicating the SIM result comprises receiving an indication of a first SIM result, performed using a first subset of symbols of the quantity of symbols, associated with the UL Tx beam from a first panel of the second wireless node and a first DL Rx beam from a second panel of the second wireless node; and receiving an indication of a second SIM result, performed using a second subset of symbols of the quantity of symbols, associated with the UL Tx beam from the first panel of the second wireless node and a second DL Rx beam from the second panel of the second wireless node.

In an eighth aspect, alone or in combination with one or more of the first through seventh aspects, the uplink transmission is a PUSCH transmission.

In a ninth aspect, alone or in combination with one or more of the first through eighth aspects, process 1100 includes transmitting, to the second wireless node, a configuration for a SIM procedure, wherein receiving the measurement is based at least in part on the configuration for the SIM procedure.

In a tenth aspect, alone or in combination with one or more of the first through ninth aspects, a communication mode of the second wireless node is the half duplex communication mode, and the configuration for the SIM procedure configures at least one of a measurement window to perform the SIM, an allocation of resources to be used by the first wireless node for transmitting the measurement report, or one or more periodic SRSs.

In an eleventh aspect, alone or in combination with one or more of the first through tenth aspects, the configuration for the SIM procedure configures the one or more periodic SRSs, and process 1100 includes receiving an SRS of the one or more periodic SRSs, based at least in part on a beam sweep, performed by the second wireless node, through one or more UL Tx beams from a first panel of the second wireless node, wherein the second wireless node, while transmitting the SRS on a UL Tx beam of the one or more UL Tx beam, performs a beam sweep through one or more DL Rx beams from a second panel of the second wireless node, and receiving the measurement report indicating the SIM result comprises receiving an indication of one or more SIM results associated with the UL Tx beam and the one or more DL Rx beams.

In a twelfth aspect, alone or in combination with one or more of the first through eleventh aspects, a communication mode of the second wireless node is the half duplex communication mode, and process 1100 includes receiving, from the second wireless node, a request indicating a requested configuration for the SIM procedure, and determining the configuration for the SIM procedure based at least in part on the request.

In a thirteenth aspect, alone or in combination with one or more of the first through twelfth aspects, a communication mode of the second wireless node is the half duplex communication mode, and process 1100 includes determining the configuration for the SIM procedure.

In a fourteenth aspect, alone or in combination with one or more of the first through thirteenth aspects, a communication mode of the second wireless node is the full duplex communication mode; and process 1100 includes configuring, in the configuration for the SIM procedure, one or more half duplex slots, and refraining from scheduling DL data transmissions during the one or more half duplex slots.

In a fifteenth aspect, alone or in combination with one or more of the first through fourteenth aspects, configuring the one or more half duplex slots comprises configuring the one or more half duplex slots based at least in part on a repetition scheme.

In a sixteenth aspect, alone or in combination with one or more of the first through fifteenth aspects, a communication mode of the second wireless node is the full duplex communication mode, and process 1100 includes receiving, from the second wireless node, a request for a SIM window based at least in part on a SIM trigger event detected by the second wireless node, wherein transmitting the configuration for the SIM procedure is based at least in part on receiving the request for the SIM window.

In a seventeenth aspect, alone or in combination with one or more of the first through sixteenth aspects, process 1100 includes receiving, from the second wireless node, a measurement report indicating another SIM result; and determining another selected UL and DL beam pair based at least in part on the measurement report indicating the other SIM result.

In an eighteenth aspect, alone or in combination with one or more of the first through seventeenth aspects, a communication mode of the second wireless node is the full duplex communication mode, and process 1100 includes receiving, from the second wireless node, an indication of a UL and DL beam pair failure and an indication of another candidate UL and DL beam pair, and determining another selected UL and DL beam pair based at least in part on the indication of the UL and DL beam pair failure and the indication of the other candidate UL and DL beam pair.

In a nineteenth aspect, alone or in combination with one or more of the first through eighteenth aspects, the indication of the UL and DL beam pair failure indicates a measurement of the selected UL and DL beam pair, and the indication of the other candidate UL and DL beam pair includes a measurement report indicating a result of a SIM associated with the other candidate UL and DL beam pair.

In a twentieth aspect, alone or in combination with one or more of the first through nineteenth aspects, receiving the indication of the UL and DL beam pair failure and the indication of the other candidate UL and DL beam pair comprises receiving the indication of the UL and DL beam pair failure and the indication of the other candidate UL and DL beam pair using a MAC-CE in a PUSCH transmission.

In a twenty-first aspect, alone or in combination with one or more of the first through twentieth aspects, receiving the indication of the UL and DL beam pair failure and the indication of the other candidate UL and DL beam pair comprises receiving, from the second wireless node, a scheduling request for an allocation of UL resources; transmitting, to the second wireless node, a scheduling grant allocating UL resources, and receiving, using the allocated UL resources, the indication of the UL and DL beam pair failure and the indication of the other candidate UL and DL beam pair.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a first wireless node, comprising: transmitting, to a second wireless node, an indication of a set of suitable uplink (UL) beams and a set of suitable downlink (DL) beams from a plurality of beams associated with the first wireless node, wherein the set of suitable UL beams and the set of suitable DL beams are suitable for full duplex communications; and communicating with the second wireless node based at least in part on the indication of the set of suitable UL beams and the set of suitable DL beams.

Aspect 2: The method of Aspect 1, wherein the first wireless node is a user equipment, a mobile terminal, or a child node.

Aspect 3: The method of any of Aspects 1-2, wherein the second wireless node is a base station, a parent node, or a control node.

Aspect 4: The method of any of Aspects 1-3, further comprising: performing a self-interference measurement (SIM) associated with an UL transmit (Tx) beam, from the set of suitable UL beams, from one panel of the first wireless node and a DL receive (Rx) beam, from the set of suitable DL beams, from another panel of the first wireless node; and transmitting a measurement report indicating the SIM.

Aspect 5: The method of Aspect 4, wherein performing the SIM comprises: determining one or more UL beams, from the set of suitable UL beams, to be used as Tx beams for the SIM, and determining one or more DL beams, from the set of suitable DL beams, to be used as Rx beams for the SIM.

Aspect 6: The method of any of Aspects 1-5, further comprising: determining that a beam is suitable for at least one of UL transmission or DL reception based at least in part on at least one of: a maximum permissible exposure (MPE) limit associated with the beam, a panel of the first wireless node associated with the beam, a full duplex transmit/receive (Tx/Rx) capability of the first wireless node, a channel associated with a DL and UL beam pair, a transmit power associated with the beam, or a combination thereof.

Aspect 7: The method of any of Aspects 1-6, wherein transmitting the indication comprises transmitting the indication using radio resource control signaling.

Aspect 8: The method of any of Aspects 1-7, wherein transmitting the indication comprises dynamically transmitting the indication using UL control signaling.

Aspect 9: The method of any of Aspects 1-8, wherein the first wireless node is operating in a half duplex communication mode.

Aspect 10: The method of any of Aspects 1-8, wherein the first wireless node is operating in a full duplex communication mode.

Aspect 11: The method of Aspect 10, wherein the set of suitable UL beams is a first set of suitable UL beams and the set of suitable DL beams is a first set of suitable DL beams, the method further comprising: determining, from the plurality of beams associated with the first wireless node, a second set of suitable UL beams and a second set of suitable DL beams; and transmitting, to the second wireless node, an indication of the second set of suitable UL beams and the second set of suitable DL beams.

Aspect 12: A method of wireless communication performed by a first wireless node, comprising: receiving, from a second wireless node, an indication of a set of suitable uplink (UL) beams and a set of suitable downlink (DL) beams for the second wireless node, wherein the set of suitable UL beams and the set of suitable DL beams are suitable for full duplex communications; and communicating with the second wireless node based at least in part on the indication of the set of suitable UL beams and the set of suitable DL beams.

Aspect 13: The method of Aspect 12, wherein the first wireless node is a base station, a parent node, or a control node.

Aspect 14: The method of any of Aspects 12-13, wherein the second wireless node is a user equipment, a mobile terminal node, or a child node.

Aspect 15: The method of any of Aspects 12-14, wherein communicating with the second wireless node comprises: receiving, from the second wireless node, a measurement report indicating a self-interference measurement (SIM) associated with an UL transmit (Tx) beam, from the set of suitable UL beams, from one panel of the second wireless node and a DL receive (Rx) beam, from the set of suitable DL beams, from another panel of the second wireless node; and determining a selected beam pair based at least in part on the measurement report.

Aspect 16: The method of any of Aspects 12-15, wherein the indication of the set of suitable UL beams and the set of suitable DL beams for the second wireless node is based at least in part on at least one of: a maximum permissible exposure (MPE) limit associated with the beam, a panel of the second wireless node associated with the beam, a full duplex transmit/receive (Tx/Rx) capability of the second wireless node, a channel associated with a DL and UL beam pair, a transmit power associated with the beam, or a combination thereof.

Aspect 17: The method of any of Aspects 12-16, wherein receiving the indication comprises receiving the indication using radio resource control signaling.

Aspect 18: The method of any of Aspects 12-17, wherein receiving the indication comprises dynamically receiving the indication using UL control signaling.

Aspect 19: The method of any of Aspects 12-18, wherein the second wireless node is operating in a half duplex communication mode.

Aspect 20: The method of any of Aspects 12-18, wherein the second wireless node is operating in a full duplex communication mode.

Aspect 21: The method of Aspect 20, wherein the set of suitable UL beams is a first set of suitable UL beams and the set of suitable DL beams is a first set of suitable DL beams, the method further comprising: receiving, from the second wireless node, an indication of a second set of suitable UL beams and a second set of suitable downlink DL beams for the second wireless node; and communicating with the second wireless node based at least in part on the indication of the second set of suitable UL beams and the second set of suitable downlink DL beams.

Aspect 22: A method of wireless communication performed by a first wireless node, comprising: transmitting, in a half duplex communication mode or a full duplex communication mode, an uplink transmission; performing, using the uplink transmission, a self-interference measurement (SIM) associated with an uplink (UL) transmit (Tx) beam from one panel of the first wireless node and a downlink (DL) receive (Rx) beam from another panel of the first wireless node; and transmitting, to a second wireless node, a measurement report indicating a result of the SIM.

Aspect 23: The method of Aspect 22, wherein the first wireless node is a user equipment, a mobile terminal, or a child node.

Aspect 24: The method of any of Aspects 22-23, wherein the second wireless node is a base station, a parent node, or a control node.

Aspect 25: The method of any of Aspects 22-24, further comprising: determining the UL Tx beam based at least in part on the UL Tx beam being associated with a first transmit receive point (TRP) of the second wireless node; and determining the DL Rx beam based at least in part on the DL Rx beam being associated with a second TRP of the second wireless node.

Aspect 26: The method of any of Aspects 22-25, further comprising: receiving, from the second wireless node, a downlink control information communication indicating UL transmissions associated with one or more transmit receive point (TRP) indices associated with the second wireless node, wherein performing the SIM comprises: determining the UL Tx beam based at least in part on the UL Tx beam being associated with a first TRP index of the second wireless node; and determining the DL Rx beam based at least in part on the DL Rx beam being associated with a second TRP index of the second wireless node.

Aspect 27: The method of any of Aspects 22-26, wherein the uplink transmission is at least one of: a sounding reference signal, a UL demodulation reference signal of a physical uplink shared channel (PUSCH), a UL demodulation reference signal of a physical uplink control channel (PUCCH), a UL control transmission, or a UL data transmission.

Aspect 28: The method of any of Aspects 22-27, wherein a communication mode of the first wireless node is the half duplex communication mode; and wherein transmitting the measurement report comprises transmitting an indication of a full duplex capability of the first wireless node.

Aspect 29: The method of any of Aspects 22-28, wherein a communication mode of the first wireless node is the half duplex communication mode; wherein transmitting the uplink transmission comprises transmitting the uplink transmission for a quantity of symbols; and wherein performing the SIM comprises: performing, for a first subset of symbols of the quantity of symbols, a first SIM associated with the UL Tx beam from a first panel of the first wireless node and a first DL Rx beam from a second panel of the first wireless node; and performing, for a second subset of symbols of the quantity of symbols, a second SIM associated with the UL Tx beam from the first panel of the first wireless node and a second DL Rx beam from the second panel of the first wireless node.

Aspect 30: The method of Aspect 29, wherein the uplink transmission is a physical uplink shared channel (PUSCH) transmission.

Aspect 31: The method of any of Aspects 22-30, further comprising: receiving, from the second wireless node, a configuration for a SIM procedure, wherein performing the SIM and transmitting the measurement report is based at least in part on the configuration for the SIM procedure.

Aspect 32: The method of Aspect 31, wherein a communication mode of the first wireless node is the half duplex communication mode; and wherein the configuration for the SIM procedure configures at least one of: a measurement window to perform the SIM, or an allocation of resources to be used by the first wireless node for transmitting the measurement report, or one or more periodic sounding reference signals (SRSs).

Aspect 33: The method of Aspect 32, wherein the configuration for the SIM procedure configures the one or more periodic SRSs, the method further comprising: transmitting, an SRS of the one or more periodic SRSs, using a beam sweep through one or more UL Tx beams from a first panel of the first wireless node; and wherein performing the SIM comprises: performing, while transmitting the SRS on a UL Tx beam of the one or more UL Tx beams, a beam sweep through one or more DL Rx beams from a second panel of the first wireless node to perform one or more SIMs associated with the UL Tx beam of the one or more UL Tx beams and the one or more DL Rx beams.

Aspect 34: The method of any of Aspects 31-33, wherein a communication mode of the first wireless node is the half duplex communication mode, the method further comprising: transmitting, to the second wireless node, a request indicating a requested configuration for the SIM procedure, wherein receiving the configuration for the SIM procedure is based at least in part on transmitting the request indicating the requested configuration for the SIM procedure.

Aspect 35: The method of any of Aspects 31-34, wherein a communication mode of the first wireless node is the half duplex communication mode; and wherein the configuration for the SIM procedure is based at least in part on a determination by the second wireless node of the configuration for the SIM procedure.

Aspect 36: The method of any of Aspects 31, wherein a communication mode of the first wireless node is the full duplex communication mode, wherein the configuration for the SIM procedure configures one or more half duplex slots, and wherein the second wireless node refrains from scheduling DL data transmissions during the one or more half duplex slots.

Aspect 37: The method of Aspect 36, wherein performing the SIM comprises: performing the SIM during a half duplex slot of the one or more half duplex slots; and determining whether an active DL and UL beam pair satisfies a threshold self-interference value.

Aspect 38: The method of Aspect 37, wherein one or more half duplex slots are configured based at least in part on a repetition scheme.

Aspect 39: The method of any of Aspects 31 and 36-38, wherein a communication mode of the first wireless node is the full duplex communication mode, the method further comprising: detecting a SIM trigger event; and transmitting, to the second wireless node, a request for a SIM window, wherein receiving the configuration for the SIM procedure is based at least in part on transmitting the request for the SIM window.

Aspect 40: The method of Aspect 39, wherein detecting the SIM trigger event comprises: determining that a DL signal-to-interference-plus-noise ratio (SINR) value of a DL signal from the second wireless node does not satisfy a threshold SINR value.

Aspect 41: The method of any of Aspects 39-40, further comprising: performing another SIM, based at least in part on the configuration for the SIM procedure, associated with another UL Tx beam from one panel of the first wireless node and another DL Rx beam from another panel of the first wireless node; and transmitting, to the second wireless node, a measurement report indicating a result of the other SIM.

Aspect 42: The method of any of Aspects 22-41, wherein a communication mode of the first wireless node is the full duplex communication mode, the method further comprising: determining a UL and DL beam pair failure based at least in part on a measurement of the UL and DL beam pair; determining another candidate UL and DL beam pair based at least in part on performing a SIM associated with the other candidate UL and DL beam pair; and transmitting, to the second wireless node, an indication of the UL and DL beam pair failure and an indication of the other candidate UL and DL beam pair.

Aspect 43: The method of Aspect 42, wherein determining the UL and DL beam pair failure comprises determining that the measurement of the UL and DL beam pair does not satisfy a threshold value.

Aspect 44: The method of any of Aspects 42-43, wherein the indication of the UL and DL beam pair failure indicates the measurement of the UL and DL beam pair, and wherein the indication of the other candidate UL and DL beam pair includes a measurement report indicating a result of the SIM associated with the other candidate UL and DL beam pair.

Aspect 45: The method of any of Aspects 42-44, wherein transmitting the indication of the UL and DL beam pair failure and the indication of the other candidate UL and DL beam pair comprises: determining a resource allocation, in a physical uplink shared channel (PUSCH), for a medium access control (MAC) control element (MAC-CE); and transmitting the indication of the UL and DL beam pair failure and the indication of the other candidate UL and DL beam pair using the MAC-CE.

Aspect 46: The method of any of Aspects 42-45, wherein transmitting the indication of the UL and DL beam pair failure and the indication of the other candidate UL and DL beam pair comprises: determining that there are no physical uplink shared channel (PUSCH) resources available for transmitting the indication of the UL and DL beam pair failure and the indication of the other candidate UL and DL beam pair; transmitting, to the second wireless node, a scheduling request for an allocation of UL resources; receiving, from the second wireless node, a scheduling grant allocating UL resources; and transmitting, using the allocated UL resources, the indication of the UL and DL beam pair failure and the indication of the other candidate UL and DL beam pair.

Aspect 47: A method of wireless communication performed by a first wireless node, comprising: receiving, from a second wireless node in a half duplex communication mode or a full duplex communication mode, an uplink transmission; receiving, from the second wireless node, measurement report indicating a self-interference measurement (SIM) result associated with an uplink (UL) transmit (Tx) beam from one panel of the second wireless node and a downlink (DL) receive (Rx) beam from another panel of the second wireless node; and communicating, with the second wireless node, using a selected UL and DL beam pair based at least in part on the measurement report.

Aspect 48: The method of Aspect 47, wherein the first wireless node is a base station, a parent node, or a control node.

Aspect 49: The method of any of Aspects 47-48, wherein the second wireless node is a user equipment, a mobile terminal, or a child node.

Aspect 50: The method of any of Aspects 47-49, wherein the UL Tx beam is associated with a first transmit receive point (TRP) of the first wireless node the DL Rx beam is associated with a second TRP of the first wireless node.

Aspect 51: The method of any of Aspects 47-50, further comprising: transmitting, to the second wireless node, a downlink control information communication indicating UL transmissions associated with one or more transmit receive point (TRP) indices associated with the first wireless node, wherein the UL Tx beam is associated with a first TRP index of the first wireless node the DL Rx beam is associated with a second TRP index of the first wireless node.

Aspect 52: The method of any of Aspects 47-51, wherein the SIM is performed by the second wireless node using the uplink transmission and the uplink transmission is at least one of: a UL demodulation reference signal of a physical uplink shared channel (PUSCH), a UL demodulation reference signal of a physical uplink control channel (PUCCH), a UL control transmission, or a UL data transmission.

Aspect 53: The method of any of Aspects 47-52, wherein a communication mode of the second wireless node is the half duplex communication mode; and wherein receiving the measurement report comprises receiving an indication of a full duplex capability of the first wireless node.

Aspect 54: The method of any of Aspects 47-53, wherein a communication mode of the second wireless node is the half duplex communication mode, wherein receiving the uplink transmission comprises receiving the uplink transmission for a quantity of symbols, and wherein receiving the measurement report indicating the SIM result comprises: receiving an indication of a first SIM result, performed using a first subset of symbols of the quantity of symbols, associated with the UL Tx beam from a first panel of the second wireless node and a first DL Rx beam from a second panel of the second wireless node; and receiving an indication of a second SIM result, performed using a second subset of symbols of the quantity of symbols, associated with the UL Tx beam from the first panel of the second wireless node and a second DL Rx beam from the second panel of the second wireless node.

Aspect 55: The method of Aspect 54, wherein the uplink transmission is a physical uplink shared channel (PUSCH) transmission.

Aspect 56: The method of any of Aspects 47-55, further comprising: transmitting, to the second wireless node, a configuration for a SIM procedure, wherein receiving the measurement is based at least in part on the configuration for the SIM procedure.

Aspect 57: The method of Aspect 56, wherein a communication mode of the second wireless node is the half duplex communication mode, and wherein the configuration for the SIM procedure configures at least one of: a measurement window to perform the SIM, an allocation of resources to be used by the first wireless node for transmitting the measurement report, or one or more periodic sounding reference signals (SRSs).

Aspect 58: The method of Aspect 57, wherein the configuration for the SIM procedure configures the one or more periodic SRSs, the method further comprising: receiving, an SRS of the one or more periodic SRSs, based at least in part on a beam sweep, performed by the second wireless node, through one or more UL Tx beams from a first panel of the second wireless node, wherein the second wireless node, while transmitting the SRS on a UL Tx beam of the one or more UL Tx beam, performs a beam sweep through one or more DL Rx beams from a second panel of the second wireless node, and wherein receiving the measurement report indicating the SIM result comprises: receiving an indication of one or more SIM results associated with the UL Tx beam and the one or more DL Rx beams.

Aspect 59: The method of any of Aspects 56-58, wherein a communication mode of the second wireless node is the half duplex communication mode, the method further comprising: receiving, from the second wireless node, a request indicating a requested configuration for the SIM procedure; and determining the configuration for the SIM procedure based at least in part on the request.

Aspect 60: The method of any of Aspects 56-59, wherein a communication mode of the second wireless node is the half duplex communication mode, the method further comprising: determining the configuration for the SIM procedure.

Aspect 61: The method of any of Aspects 56, wherein a communication mode of the second wireless node is the full duplex communication mode; the method further comprising: configuring, in the configuration for the SIM procedure, one or more half duplex slots; and refraining from scheduling DL data transmissions during the one or more half duplex slots.

Aspect 62: The method of Aspect 61, wherein configuring the one or more half duplex slots comprises configuring the one or more half duplex slots based at least in part on a repetition scheme.

Aspect 63: The method of any of Aspects 56 and 61-62, wherein a communication mode of the second wireless node is the full duplex communication mode, the method further comprising: receiving, from the second wireless node, a request for a SIM window based at least in part on a SIM trigger event detected by the second wireless node, wherein transmitting the configuration for the SIM procedure is based at least in part on receiving the request for the SIM window.

Aspect 64: The method of Aspect 63, further comprising: receiving, from the second wireless node, a measurement report indicating another SIM result; and determining another selected UL and DL beam pair based at least in part on the measurement report indicating the other SIM result.

Aspect 65: The method of any of Aspects 47-64, wherein a communication mode of the second wireless node is the full duplex communication mode, the method further comprising: receiving, from the second wireless node, an indication of a UL and DL beam pair failure and an indication of another candidate UL and DL beam pair; and determining another selected UL and DL beam pair based at least in part on the indication of the UL and DL beam pair failure and the indication of the other candidate UL and DL beam pair.

Aspect 66: The method of Aspect 65, wherein the indication of the UL and DL beam pair failure indicates a measurement of the selected UL and DL beam pair, and wherein the indication of the other candidate UL and DL beam pair includes a measurement report indicating a result of a SIM associated with the other candidate UL and DL beam pair.

Aspect 67: The method of any of Aspects 65-66, wherein receiving the indication of the UL and DL beam pair failure and the indication of the other candidate UL and DL beam pair comprises: receiving the indication of the UL and DL beam pair failure and the indication of the other candidate UL and DL beam pair using a medium access control (MAC) control element (MAC-CE) in a physical uplink shared channel (PUSCH) transmission.

Aspect 68: The method of any of Aspects 65-67, wherein receiving the indication of the UL and DL beam pair failure and the indication of the other candidate UL and DL beam pair comprises: receiving, from the second wireless node, a scheduling request for an allocation of UL resources; transmitting, to the second wireless node, a scheduling grant allocating UL resources; and receiving, using the allocated UL resources, the indication of the UL and DL beam pair failure and the indication of the other candidate UL and DL beam pair.

Aspect 69: An apparatus for wireless communication at a device, comprising a processor; memory coupled with the processor; and instructions stored in the memory and executable by the processor to cause the apparatus to perform the method of one or more of Aspects 1-11.

Aspect 70: A device for wireless communication, comprising a memory and one or more processors coupled to the memory, the one or more processors configured to perform the method of one or more of Aspects 1-11.

Aspect 71: An apparatus for wireless communication, comprising at least one means for performing the method of one or more of Aspects 1-11.

Aspect 72: A non-transitory computer-readable medium storing code for wireless communication, the code comprising instructions executable by a processor to perform the method of one or more of Aspects 1-11.

Aspect 73: A non-transitory computer-readable medium storing a set of instructions for wireless communication, the set of instructions comprising one or more instructions that, when executed by one or more processors of a device, cause the device to perform the method of one or more of Aspects 1-11.

Aspect 74: An apparatus for wireless communication at a device, comprising a processor; memory coupled with the processor; and instructions stored in the memory and executable by the processor to cause the apparatus to perform the method of one or more of Aspects 12-21.

Aspect 75: A device for wireless communication, comprising a memory and one or more processors coupled to the memory, the one or more processors configured to perform the method of one or more of Aspects 12-21.

Aspect 76: An apparatus for wireless communication, comprising at least one means for performing the method of one or more of Aspects 12-21.

Aspect 77: A non-transitory computer-readable medium storing code for wireless communication, the code comprising instructions executable by a processor to perform the method of one or more of Aspects 12-21.

Aspect 78: A non-transitory computer-readable medium storing a set of instructions for wireless communication, the set of instructions comprising one or more instructions that, when executed by one or more processors of a device, cause the device to perform the method of one or more of Aspects 12-21.

Aspect 79: An apparatus for wireless communication at a device, comprising a processor; memory coupled with the processor; and instructions stored in the memory and executable by the processor to cause the apparatus to perform the method of one or more of Aspects 22-46.

Aspect 80: A device for wireless communication, comprising a memory and one or more processors coupled to the memory, the one or more processors configured to perform the method of one or more of Aspects 22-46.

Aspect 81: An apparatus for wireless communication, comprising at least one means for performing the method of one or more of Aspects 22-46.

Aspect 82: A non-transitory computer-readable medium storing code for wireless communication, the code comprising instructions executable by a processor to perform the method of one or more of Aspects 22-46.

Aspect 83: A non-transitory computer-readable medium storing a set of instructions for wireless communication, the set of instructions comprising one or more instructions that, when executed by one or more processors of a device, cause the device to perform the method of one or more of Aspects 22-46.

Aspect 84: An apparatus for wireless communication at a device, comprising a processor; memory coupled with the processor; and instructions stored in the memory and executable by the processor to cause the apparatus to perform the method of one or more of Aspects 47-68.

Aspect 85: A device for wireless communication, comprising a memory and one or more processors coupled to the memory, the one or more processors configured to perform the method of one or more of Aspects 47-68.

Aspect 86: An apparatus for wireless communication, comprising at least one means for performing the method of one or more of Aspects 47-68.

Aspect 87: A non-transitory computer-readable medium storing code for wireless communication, the code comprising instructions executable by a processor to perform the method of one or more of Aspects 47-68.

Aspect 88: A non-transitory computer-readable medium storing a set of instructions for wireless communication, the set of instructions comprising one or more instructions that, when executed by one or more processors of a device, cause the device to perform the method of one or more of Aspects 47-68.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless node for wireless communication, comprising:
   one or more memories; and
   one or more processors, coupled to the one or more memories, configured to:
   transmit, to a second wireless node, an indication of a set of suitable uplink (UL) beams and a set of suitable downlink (DL) beams from a plurality of beams associated with the first wireless node, wherein the set of suitable UL beams and the set of suitable DL beams are suitable for full duplex communications; and
   communicate with the second wireless node based at least in part on the indication of the set of suitable UL beams and the set of suitable DL beams.

2. The first wireless node of claim 1, wherein the one or more processors are further configured to:
   perform a self-interference measurement (SIM) associated with an UL transmit (Tx) beam, from the set of suitable UL beams, from one panel of the first wireless node and a DL receive (Rx) beam, from the set of suitable DL beams, from another panel of the first wireless node; and
   transmit a measurement report indicating the SIM.

3. The first wireless node of claim 1, wherein the one or more processors are further configured to:
   determine that a beam is suitable for at least one of UL transmission or DL reception based at least in part on at least one of:
   a maximum permissible exposure (MPE) limit associated with the beam,
   a panel of the first wireless node associated with the beam,
   a full duplex transmit/receive (Tx/Rx) capability of the first wireless node,
   a channel associated with a DL and UL beam pair, or
   a transmit power associated with the beam.

4. The first wireless node of claim 1, wherein the one or more processors, to transmit the indication, are configured to transmit the indication using radio resource control signaling.

5. The first wireless node of claim 1, wherein the one or more processors, to transmit the indication, are configured to dynamically transmit the indication using UL control signaling.

6. The first wireless node of claim 1, wherein the one or more processors are further configured to:
   determine that a beam group is suitable for at least one of UL transmission or DL reception based at least in part on at least one of:
      a maximum permissible exposure (MPE) limit associated with the beam group,
      a panel of the first wireless node associated with the beam group, or
      a combination thereof; and
   wherein the indication of the set of suitable uplink (UL) beams and the set of suitable downlink (DL) beams is based at least in part on the beam group.

7. The first wireless node of claim 6, wherein the beam group comprises beams associated with a same antenna panel of the first wireless node.

8. A method of wireless communication performed by a first wireless node, comprising:
   transmitting, to a second wireless node, an indication of a set of suitable uplink (UL) beams and a set of suitable downlink (DL) beams from a plurality of beams associated with the first wireless node, wherein the set of suitable UL beams and the set of suitable DL beams are suitable for full duplex communications; and
   communicating with the second wireless node based at least in part on the indication of the set of suitable UL beams and the set of suitable DL beams.

9. The method of claim 8, further comprising:
   performing a self-interference measurement (SIM) associated with an UL transmit (Tx) beam, from the set of suitable UL beams, from one panel of the first wireless node and a DL receive (Rx) beam, from the set of suitable DL beams, from another panel of the first wireless node; and
   transmitting a measurement report indicating the SIM.

10. The method of claim 8, further comprising:
    determining that a beam is suitable for at least one of UL transmission or DL reception based at least in part on at least one of:
       a maximum permissible exposure (MPE) limit associated with the beam,
       a panel of the first wireless node associated with the beam,
       a full duplex transmit/receive (Tx/Rx) capability of the first wireless node,
       a channel associated with a DL and UL beam pair, or
       a transmit power associated with the beam.

11. The method of claim 8, wherein transmitting the indication comprises transmitting the indication using radio resource control signaling.

12. The method of claim 8, wherein transmitting the indication comprises dynamically transmitting the indication using UL control signaling.

13. The method of claim 8, further comprising:
    determining that a beam group is suitable for at least one of UL transmission or DL reception based at least in part on at least one of:
       a maximum permissible exposure (MPE) limit associated with the beam group,
       a panel of the first wireless node associated with the beam group, or
       a combination thereof; and
    wherein the indication of the set of suitable uplink (UL) beams and the set of suitable downlink (DL) beams is based at least in part on the beam group.

14. The method of claim 13, wherein the beam group comprises beams associated with a same antenna panel of the first wireless node.

15. A non-transitory computer-readable medium storing a set of instructions for wireless communication, the set of instructions comprising:
    one or more instructions that, when executed by one or more processors of a first wireless node, cause the wireless node to:
    transmit, to a second wireless node, an indication of a set of suitable uplink (UL) beams and a set of suitable downlink (DL) beams from a plurality of beams associated with the first wireless node, wherein the set of suitable UL beams and the set of suitable DL beams are suitable for full duplex communications; and
    communicate with the second wireless node based at least in part on the indication of the set of suitable UL beams and the set of suitable DL beams.

16. The non-transitory computer-readable medium of claim 15, wherein the one or more instructions further cause the wireless node to:
    perform a self-interference measurement (SIM) associated with an UL transmit (Tx) beam, from the set of suitable UL beams, from one panel of the first wireless node, and a DL receive (Rx) beam, from the set of suitable DL beams, from another panel of the first wireless node; and
    transmit a measurement report indicating the SIM.

17. The non-transitory computer-readable medium of claim 15, wherein the one or more instructions further cause the wireless node to:
    determine that a beam is suitable for at least one of UL transmission or DL reception based at least in part on at least one of:
       a maximum permissible exposure (MPE) limit associated with the beam,
       a panel of the first wireless node associated with the beam,
       a full duplex transmit/receive (Tx/Rx) capability of the first wireless node,
       a channel associated with a DL and UL beam pair, or
       a transmit power associated with the beam.

18. The non-transitory computer-readable medium of claim 15, wherein the one or more instructions, to cause the wireless node to transmit the indication, cause the wireless node to transmit the indication using radio resource control signaling.

19. The non-transitory computer-readable medium of claim 15, wherein the one or more instructions, to cause the wireless node to transmit the indication, cause the wireless node to dynamically transmit the indication using UL control signaling.

20. The non-transitory computer-readable medium of claim 15, wherein the one or more instructions further cause the wireless node to:
    determine that a beam group is suitable for at least one of UL transmission or DL reception based at least in part on at least one of:
       a maximum permissible exposure (MPE) limit associated with the beam group, a panel of the first wireless node associated with the beam group, or a combination thereof; and wherein the indication of the set of suitable uplink (UL) beams and the set of suitable downlink (DL) beams is based at least in part on the beam group.

* * * * *